(12) United States Patent
Cousins et al.

(10) Patent No.: US 10,534,784 B2
(45) Date of Patent: Jan. 14, 2020

(54) FORMULATION AND DELIVERY OF DYNAMIC, SEVERITY-BASED WEATHER PERIL SCORING

(71) Applicant: Athenium, LLC, Dover, NH (US)

(72) Inventors: Ellen Dee Cousins, Rockville, MD (US); Stefan Francis Cecelski, Odenton, MD (US)

(73) Assignee: Athenium, LLC, Washington, DC (US)

( * ) Notice: Subject to any disclaimer, the term of this patent is extended or adjusted under 35 U.S.C. 154(b) by 148 days.

(21) Appl. No.: 15/823,871

(22) Filed: Nov. 28, 2017

(65) Prior Publication Data

US 2018/0322123 A1    Nov. 8, 2018

Related U.S. Application Data

(60) Provisional application No. 62/502,115, filed on May 5, 2017.

(51) Int. Cl.
| | |
|---|---|
| *G06F 16/2457* | (2019.01) |
| *G06Q 40/08* | (2012.01) |
| *G06F 17/18* | (2006.01) |
| *G06F 16/29* | (2019.01) |
| *G06F 16/28* | (2019.01) |

(52) U.S. Cl.
CPC ...... *G06F 16/24578* (2019.01); *G06F 16/284* (2019.01); *G06F 16/29* (2019.01); *G06F 17/18* (2013.01); *G06Q 40/08* (2013.01)

(58) Field of Classification Search
CPC ........ G06F 16/284; G06F 16/29; G06F 17/18; G06Q 40/08; G01W 1/00; G06G 7/56
USPC .............................................. 707/748; 702/3
See application file for complete search history.

(56) References Cited

U.S. PATENT DOCUMENTS

| | | | | |
|---|---|---|---|---|
| 7,191,064 | B1* | 3/2007 | Myers ..................... | G01W 1/00 702/3 |
| 8,280,633 | B1* | 10/2012 | Eldering ................ | G06Q 40/08 702/3 |
| 10,296,983 | B2* | 5/2019 | Carbajal De Nova ...................... | G06Q 40/12 |
| 2006/0282295 | A1* | 12/2006 | McComb ............... | G06Q 40/08 705/4 |
| 2009/0259581 | A1* | 10/2009 | Horowitz ............... | G06Q 40/06 705/35 |
| 2018/0170349 | A1* | 6/2018 | Jobson ............. | B60W 50/0097 |

* cited by examiner

*Primary Examiner* — Dung K Chau
(74) *Attorney, Agent, or Firm* — Sheehan Phinney Bass & Green PA

(57) ABSTRACT

A computer-based method of formulating and delivering dynamic, severity-based weather peril scoring includes ingesting human-observed weather data and radar weather data, applying a grid that has a plurality of cells to a map of a geographical region to divide the geographical region into a plurality of areas, with each area being defined by a corresponding one of the grid cells, for each area/grid cell: calculating, with a computer-based processor, a first severity-weighted risk index for at least one weather peril based on the human-observed weather data, calculating, with the computer-based processor, a second severity-weighted risk index for the at least one weather peril based on the radar weather data, and blending, with the computer-based processor, the first severity-weighted risk index and the second severity-weighted risk index to produce a blended risk index.

28 Claims, 13 Drawing Sheets

Raw SPC Data

| om | yr | mo | dy | date | time | tz | st | stf | stn | mag | inj | fat | loss | closs | slat | slon | elat | elon | len | wid | ns | sn | sg | f1 | f2 | f3 | f4 |
|---|---|---|---|---|---|---|---|---|---|---|---|---|---|---|---|---|---|---|---|---|---|---|---|---|---|---|---|
| 556570 | 2015 | 2 | 1 | 2/1/15 | 154800 | 3 | LA | 22 | 0 | 1 | 0 | 0 | 0 | 0 | 32.68 | -91.18 | 32.68 | -91.18 | 0 | 0 | 0 | 0 | 0 | 35 | 0 | 0 | 0 |
| 556630 | 2015 | 2 | 1 | 2/1/15 | 163000 | 3 | LA | 22 | 0 | 1 | 0 | 0 | 0 | 0 | 31.27 | -92.69 | 31.27 | -92.69 | 0 | 0 | 0 | 0 | 0 | 79 | 0 | 0 | 0 |
| 556871 | 2015 | 2 | 9 | 2/9/15 | 182000 | 3 | GA | 13 | 0 | 1 | 0 | 0 | 0 | 0 | 31.4 | -82.92 | 31.4 | -82.92 | 0 | 0 | 0 | 0 | 0 | 68 | 0 | 0 | 0 |
| 556892 | 2015 | 2 | 28 | 2/28/15 | 125100 | 3 | FL | 12 | 0 | 0.75 | 0 | 0 | 0 | 0 | 26.883 | -80.1311 | 26.883 | -80.1311 | 0 | 0 | 0 | 0 | 0 | 99 | 0 | 0 | 0 |
| 556874 | 2015 | 2 | 28 | 2/28/15 | 175500 | 3 | FL | 12 | 0 | 0.75 | 0 | 0 | 0 | 0 | 27.53 | -81.01 | 27.53 | -81.01 | 0 | 0 | 0 | 0 | 0 | 98 | 0 | 0 | 0 |
| 557204 | 2015 | 3 | 11 | 3/11/15 | 160400 | 3 | NC | 37 | 0 | 0.88 | 0 | 0 | 0 | 0 | 35.6 | -76.79 | 35.6 | -76.79 | 0 | 0 | 0 | 0 | 0 | 13 | 0 | 0 | 0 |
| 557306 | 2015 | 3 | 11 | 3/11/15 | 161500 | 3 | NC | 37 | 0 | 1 | 0 | 0 | 0 | 0 | 35.59 | -76.66 | 35.59 | -76.66 | 0 | 0 | 0 | 0 | 0 | 13 | 0 | 0 | 0 |
| 557308 | 2015 | 3 | 11 | 3/11/15 | 166500 | 3 | NC | 37 | 0 | 1.75 | 0 | 0 | 0 | 0 | 35.47 | -76.43 | 35.47 | -76.43 | 0 | 0 | 0 | 0 | 0 | 95 | 0 | 0 | 0 |
| 558444 | 2015 | 3 | 18 | 3/18/15 | 205600 | 3 | MS | 28 | 0 | 1 | 0 | 0 | 0 | 0 | 31.7249 | -89.4641 | 31.7249 | -89.4641 | 0 | 0 | 0 | 0 | 0 | 31 | 0 | 0 | 0 |
| 560612 | 2015 | 3 | 19 | 3/19/15 | 164800 | 3 | TX | 48 | 0 | 1 | 0 | 0 | 0 | 0 | 33.85 | -98.84 | 33.85 | -98.84 | 0 | 0 | 0 | 0 | 0 | 465 | 0 | 0 | 0 |

FIG. 4A

After Ingestion of SPC Data

| datetime | size | state | lat | lon | property_loss_dollars | crop_loss_dollars |
|---|---|---|---|---|---|---|
| 20150201214800 | 1 | LA | 32.68 | -91.18 | N/A | N/A |
| 20150201223000 | 1 | LA | 31.27 | -92.69 | N/A | N/A |
| 20150210002000 | 0.75 | GA | 31.4 | -82.92 | N/A | N/A |
| 20150228125100 | 0.75 | FL | 26.883 | -80.1311 | N/A | N/A |
| 20150228233500 | 0.88 | FL | 27.53 | -81.01 | N/A | N/A |
| 20150311220600 | 1 | NC | 35.6 | -76.79 | N/A | N/A |
| 20150311221500 | 1 | NC | 35.59 | -76.66 | N/A | N/A |
| 20150311223500 | 1.75 | NC | 35.47 | -76.43 | N/A | N/A |
| 20150319002500 | 1 | MS | 31.7249 | -89.4641 | N/A | N/A |
| 20150319224900 | 1 | TX | 33.85 | -98.84 | N/A | N/A |

FIG. 4B

Raw NCDC Data

| #ZTIME | LON | LAT | WSR_ID | CELL_ID | RANGE | AZIMUTH | SEVPROB | PROB | MAXSIZE |
|---|---|---|---|---|---|---|---|---|---|
| 20100101035402 | -95.20584 | 26.07394 | KBRO | C0 | 120 | 85 | 30 | 80 | 0.75 |
| 20100101035929 | -95.50304 | 25.78207 | KBRO | G0 | 104 | 94 | 0 | 10 | 0.5 |
| 20100101035929 | -94.06316 | 28.08074 | KHGX | I3 | 99 | 147 | 30 | 60 | 0.5 |
| 20100101035929 | -95.18497 | 26.03989 | KBRO | C0 | 121 | 86 | 40 | 90 | 0.75 |
| 20100101040426 | -93.99819 | 28.09883 | KHGX | I3 | 100 | 145 | 20 | 50 | 0.5 |
| 20100101040456 | -96.11961 | 24.80426 | KBRO | I0 | 97 | 133 | 0 | 40 | 0.5 |
| 20100101040456 | -95.14627 | 26.0058 | KBRO | C0 | 123 | 87 | 40 | 90 | 0.75 |
| 20100101040925 | -93.9603 | 28.10193 | KHGX | I3 | 101 | 144 | 20 | 40 | 0.5 |
| 20100101041023 | -95.10929 | 26.06697 | KBRO | C0 | 125 | 87 | -999 | -999 | -999 |
| 20100101041023 | -96.08494 | 24.81362 | KBRO | I0 | 98 | 132 | 0 | 20 | 0.5 |

FIG. 4C

After Ingestion of NCDC Data

| timestamp | station_id | MESH_in | PROB_% | POSH_% | CELL_ID |
|---|---|---|---|---|---|
| 2010-01-01 03:54:00+00 | 1924989283 | 0.75 | 80 | 30 | C0 |
| 2010-01-01 03:59:00+00 | 1917974977 | 0.5 | 10 | 0 | G0 |
| 2010-01-01 03:59:00+00 | 1972829747 | 0.5 | 60 | 30 | I3 |
| 2010-01-01 03:59:00+00 | 1924078663 | 0.75 | 90 | 40 | C0 |
| 2010-01-01 04:04:00+00 | 1973252497 | 0.5 | 50 | 20 | I3 |
| 2010-01-01 04:04:00+00 | 1894842818 | 0.5 | 40 | 0 | I0 |
| 2010-01-01 04:04:00+00 | 1923382795 | 0.75 | 90 | 40 | C0 |
| 2010-01-01 04:09:00+00 | 1973390914 | 0.5 | 40 | 20 | I3 |
| 2010-01-01 04:10:00+00 | 1895155130 | 0.5 | 20 | 0 | I0 |

After Calculating Raw SPC Probabilities

| Grid ID | Counts | Prob_c1 | Prob_c2 | Prob_c3 | Prob_c4 |
|---|---|---|---|---|---|
| 2102208641 | 264 | 0.0765 | 0.1125 | 0.006 | 0.003 |
| 2103548745 | 228 | 0.06675 | 0.09675 | 0.006 | 0.0015 |
| 2104163228 | 254 | 0.072 | 0.11175 | 0.00525 | 0.0015 |
| 2104258741 | 275 | 0.09225 | 0.09 | 0.01875 | 0.00525 |
| 2104773966 | 244 | 0.07275 | 0.102 | 0.006 | 0.00225 |
| 2104908030 | 258 | 0.08325 | 0.0885 | 0.0165 | 0.00525 |
| 2105400582 | 302 | 0.075 | 0.1245 | 0.021 | 0.006 |
| 2105493819 | 218 | 0.0615 | 0.093 | 0.00825 | 0.00075 |
| 2105554150 | 250 | 0.078 | 0.09075 | 0.01575 | 0.003 |
| 2106067728 | 315 | 0.08475 | 0.1245 | 0.021 | 0.006 |

FIG. 4F

After Correcting Population Bias in SPC probabilities

| Grid ID | Prob_c1 | Prob_c2 | Prob_c3 | Prob_c4 | Pop. Factor |
|---|---|---|---|---|---|
| 2102208641 | 0.1052 | 0.1547 | 0.0083 | 0.0041 | 0.7271 |
| 2103548745 | 0.1249 | 0.1811 | 0.0112 | 0.0028 | 0.5343 |
| 2104163228 | 0.1336 | 0.2074 | 0.0097 | 0.0028 | 0.5389 |
| 2104258741 | 0.1657 | 0.1616 | 0.0337 | 0.0094 | 0.5568 |
| 2104773966 | 0.1337 | 0.1875 | 0.0110 | 0.0041 | 0.5440 |
| 2104908030 | 0.1495 | 0.1589 | 0.0296 | 0.0094 | 0.5568 |
| 2105400582 | 0.1391 | 0.2309 | 0.0389 | 0.0111 | 0.5393 |
| 2105493819 | 0.1151 | 0.1741 | 0.0154 | 0.0014 | 0.5343 |
| 2105554150 | 0.1401 | 0.1630 | 0.0283 | 0.0054 | 0.5568 |
| 2106067728 | 0.1572 | 0.2309 | 0.0389 | 0.0111 | 0.5393 |

FIG. 4G

After SPC severity-weighted risk index

| Grid ID | Prob_c1 | Prob_c2 | Prob_c3 | Prob_c4 | Risk Index | Pop. Factor |
|---|---|---|---|---|---|---|
| 2102208641 | 0.1052 | 0.1547 | 0.0083 | 0.0041 | 8.4787 | 0.7271 |
| 2103548745 | 0.1249 | 0.1811 | 0.0112 | 0.0028 | 9.0719 | 0.5343 |
| 2104163228 | 0.1336 | 0.2074 | 0.0097 | 0.0028 | 9.6221 | 0.5389 |
| 2104258741 | 0.1657 | 0.1616 | 0.0337 | 0.0094 | 15.8916 | 0.5568 |
| 2104773966 | 0.1337 | 0.1875 | 0.0110 | 0.0041 | 9.9800 | 0.5440 |
| 2104908030 | 0.1495 | 0.1589 | 0.0296 | 0.0094 | 15.1184 | 0.5568 |
| 2105400582 | 0.1391 | 0.2309 | 0.0389 | 0.0111 | 19.7410 | 0.5393 |
| 2105493819 | 0.1151 | 0.1741 | 0.0154 | 0.0014 | 8.7639 | 0.5343 |
| 2105554150 | 0.1401 | 0.1630 | 0.0283 | 0.0054 | 12.7786 | 0.5568 |
| 2106067728 | 0.1572 | 0.2309 | 0.0389 | 0.0111 | 19.7708 | 0.5393 |

FIG. 4H

After Calculated NCDC Severity-Weighted Risk Index

| Grid ID | Prob_c1 | Prob_c2 | Prob_c3 | Prob_c4 | Risk Index | Radar Quality Factor |
|---|---|---|---|---|---|---|
| 2102208641 | 0.0038 | 0.1988 | 0.0488 | 0.0188 | 24.3580 | 1.4905 |
| 2103548745 | 0.0075 | 0.2063 | 0.0488 | 0.0263 | 28.7198 | 1.8450 |
| 2104163228 | 0.0225 | 0.1950 | 0.0488 | 0.0188 | 24.2757 | 1.7468 |
| 2104258741 | 0.0075 | 0.1875 | 0.0638 | 0.0075 | 20.2997 | 1.6977 |
| 2104773966 | 0.0188 | 0.2063 | 0.0638 | 0.0263 | 31.2071 | 1.6896 |
| 2104908030 | 0.0263 | 0.2138 | 0.0638 | 0.0113 | 23.1883 | 1.9341 |
| 2105400582 | 0.0075 | 0.1800 | 0.1125 | 0.0338 | 42.5476 | 1.2834 |
| 2105493819 | 0.0075 | 0.1800 | 0.0675 | 0.0300 | 33.0769 | 2.1117 |
| 2105554150 | 0.0150 | 0.1950 | 0.0563 | 0.0188 | 25.4977 | 2.1808 |
| 2106067728 | 0.0225 | 0.1388 | 0.1200 | 0.0338 | 42.5602 | 1.3902 |

FIG. 4I

After Blending Two Estimates

| Grid ID | Prob_c1 | Prob_c2 | Prob_c3 | Prob_c4 | Risk Index |
|---|---|---|---|---|---|
| 2102208641 | 0.0328 | 0.1861 | 0.0371 | 0.0146 | 19.8073 |
| 2103548745 | 0.0354 | 0.2003 | 0.0398 | 0.0207 | 24.0548 |
| 2104163228 | 0.0488 | 0.1979 | 0.0395 | 0.0150 | 20.8098 |
| 2104258741 | 0.0456 | 0.1813 | 0.0565 | 0.0080 | 19.2367 |
| 2104773966 | 0.0460 | 0.2018 | 0.0513 | 0.0210 | 26.1828 |
| 2104908030 | 0.0567 | 0.2002 | 0.0553 | 0.0108 | 21.1937 |
| 2105400582 | 0.0368 | 0.1913 | 0.0961 | 0.0287 | 37.4620 |
| 2105493819 | 0.0337 | 0.1786 | 0.0548 | 0.0230 | 27.1543 |
| 2105554150 | 0.0466 | 0.1869 | 0.0492 | 0.0154 | 22.2824 |
| 2106067728 | 0.0530 | 0.1596 | 0.1016 | 0.0286 | 37.3991 |

FIG. 4J

After Applying Spatial Smoothing and Categorizing into Risk Zones

| Grid ID | Prob_c1 | Prob_c2 | Prob_c3 | Prob_c4 | Risk Index | Zone |
|---|---|---|---|---|---|---|
| 2102208641 | 0.047 | 0.230 | 0.058 | 0.017 | 25.757 | 4 |
| 2103548745 | 0.051 | 0.229 | 0.058 | 0.018 | 26.272 | 4 |
| 2104163228 | 0.050 | 0.230 | 0.059 | 0.017 | 26.138 | 4 |
| 2104258741 | 0.055 | 0.217 | 0.067 | 0.022 | 29.911 | 5 |
| 2104773966 | 0.048 | 0.231 | 0.060 | 0.017 | 26.167 | 4 |
| 2104908030 | 0.056 | 0.218 | 0.065 | 0.021 | 28.996 | 5 |
| 2105400582 | 0.049 | 0.212 | 0.077 | 0.029 | 35.023 | 7 |
| 2105493819 | 0.052 | 0.229 | 0.060 | 0.018 | 26.941 | 4 |
| 2105554150 | 0.055 | 0.220 | 0.062 | 0.020 | 28.029 | 5 |
| 2106067728 | 0.050 | 0.213 | 0.075 | 0.027 | 33.737 | 6 |

FORMULATION AND DELIVERY OF DYNAMIC, SEVERITY-BASED WEATHER PERIL SCORING

CROSS-REFERENCE TO RELATED APPLICATION(S)

This application claims priority to U.S. provisional patent application Ser. No. 62/502,115, entitled Formulation and Delivery of Dynamic, Severity-Based Weather Peril Scoring, which was filed on May 5, 2017. The subject matter of the prior application is being incorporated herein by reference in its entirety.

FIELD OF THE INVENTION

This disclosure relates to weather peril scoring and, more particularly, relates to formulations and delivery of dynamic, severity-based weather scoring.

BACKGROUND

Weather peril scoring is widespread in several industries. For instance, it is a vital tool for property and casualty insurance underwriters who need to know the risk of damaging weather at a location when deciding whether to issue a policy at that location and when setting appropriate premiums. Generally, the state of peril scoring is rudimentary, with scores calculated based on historical experience with large catastrophic events. Because the frequency of such events is relatively low, the scores are rarely updated, leaving users with stale scores that do not reflect the risks of weather from more minor, but still damaging events. Also, the scores are generally provided for large geographic areas, and, accordingly do not have the granularity to provide a useful prediction of the likelihood of a damaging event at a particular location. In addition, to the extent current peril scoring relies on human observational data (for example, reports of hail or tornadic storms), the scores are heavily influenced by population density. That is, there tend to be more human observations of weather events in more heavily populated areas—leading to artificially low peril scores in more rural areas. Another problem with current peril scoring paradigms is that they tend to be over-reliant on the probability of a peril's occurrence without considering the likely severity of a weather event. The resulting peril score is far less useful to end users who use the scores to determine the likelihood of a damaging event, like underwriters.

SUMMARY OF THE INVENTION

In one aspect, a computer-based method of formulating and delivering dynamic, severity-based weather peril scoring is disclosed. The method includes ingesting human-observed weather data and radar weather data, applying a grid that has a plurality of cells to a map of a geographical region to divide the geographical region into a plurality of areas, with each area being defined by a corresponding one of the grid cells, for each area/grid cell: calculating, with a computer-based processor, a first severity-weighted risk index for at least one weather peril based on the human-observed weather data, calculating, with the computer-based processor, a second severity-weighted risk index for the at least one weather peril based on the radar weather data, and blending, with the computer-based processor, the first severity-weighted risk index and the second severity-weighted risk index to produce a blended risk index.

In some implementations, the computer-based method further includes applying spatial smoothing to the first severity-weighted risk indices, the second severity-weighted risk indices, and/or the blended risk indices across the areas/grid cells to produce at least smoothed-out blended risk indices.

Moreover, certain implementations include categorizing each area/grid cell into one of a plurality of possible risk zones, where categorizing each area/grid cell into one of a plurality of possible risk zones may include, for example: calculating a first risk score (e.g., by percentile-based binning) the smoothed-out blended risk indices, calculating a second risk score (e.g., by equal-interval binning) the smoothed-out blended risk indices; and averaging (weighted or not) the first risk score and the second risk score.

In another aspect, a computer-based system is configured to formulate and deliver dynamic, severity-based weather peril scoring. The system includes: a computer-based processor, and a computer-based memory coupled to the computer-based processor. The computer-based memory stores instructions which, when executed by the computer-based processor, cause the computer-based processor to: apply a grid that has a plurality of cells to a map of a geographical region to divide the geographical region into a plurality of areas, with each area being defined by a corresponding one of the grid cells; and for each area/grid cell: calculate a first severity-weighted risk index for at least one weather peril based on ingested human-observed weather data, calculate a second severity-weighted risk index for the at least one weather peril based on ingested radar weather data, and blend the first severity-weighted risk index and the second severity-weighted risk index to produce a blended risk index.

In some implementations, the instructions, when executed by the computer-based processor, further cause the computer-based processor to produce the blended risk index by: weighting the first severity-weighted risk index based on population density, weighting the second severity-weighted risk index based on radar quality, and weighting the second severity-weighted risk index more than the first severity-weighted risk index.

Moreover, according to certain implementations, the instructions, when executed by the computer-based processor, further cause the computer-based processor to: categorize each area/grid cell into one of a plurality of possible risk zones, where categorizing each area/grid cell into one of a plurality of possible risk zones may include, for example: calculating a first risk score by percentile-based binning the smoothed-out blended risk indices, calculating a second risk score by equal-interval binning the smoothed-out blended risk indices, and averaging the first risk score and the second risk score.

In some implementations, one or more of the following advantages are present.

In various implementations, the systems and techniques disclosed herein address, minimize and/or overcome shortcomings associated with the state of peril scoring technology by (1) regularly ingesting and homogenizing current weather data, including, in a typical implementation, human-observer, radar data, reanalysis weather model data, and/or weather station data, (2) creating a granular geographic grid system, (3) correcting for data bias or weaknesses, whether population bias, gaps in radar or station data, known reanalysis model performance weaknesses, or other biases, (4) for each data source calculating probabilities of severity categories per grid cell, (5) creating a single severity risk index per data source, (6) creating a weighted average of the severity indices per grid cell as a single peril risk score, and/or (7) delivering the peril score to end users, which in the exemplary implementation may take the form of a map delivered through a graphical user interface ("GUI") to an end user, or data delivered through an Application Programming Interface ("API").

In at least some implementations, therefore, the subject matter disclosed herein provides frequently updated, highly accurate, weather peril scoring for small to large geographic areas. This gives folks, especially property and casualty insurance underwriters, a useful prediction of the likelihood of a damaging event occurring at a particular location. The techniques typically rely upon and incorporate human and radar observational data (and, perhaps, other data). The scores are largely immune to population density bias. Moreover, the systems and techniques account for not only the probability of a peril's occurrence, but also the likely severity of a weather event. The resulting peril scoring is far more useful to end users who use the scores to determine the likelihood of a damaging event, like underwriters. Additionally, the GUI interface allows users to access and view data in a highly intuitive, useful manner.

Other features and advantages will be apparent from the description and drawings, and from the claims.

BRIEF DESCRIPTION OF THE DRAWINGS

FIGS. 4A to 4J show examples of data sets/data snapshots at various points in the weather peril scoring process performed by the system of FIG. 1.

Like reference characters refer to like elements.

DETAILED DESCRIPTION

Figure 1:
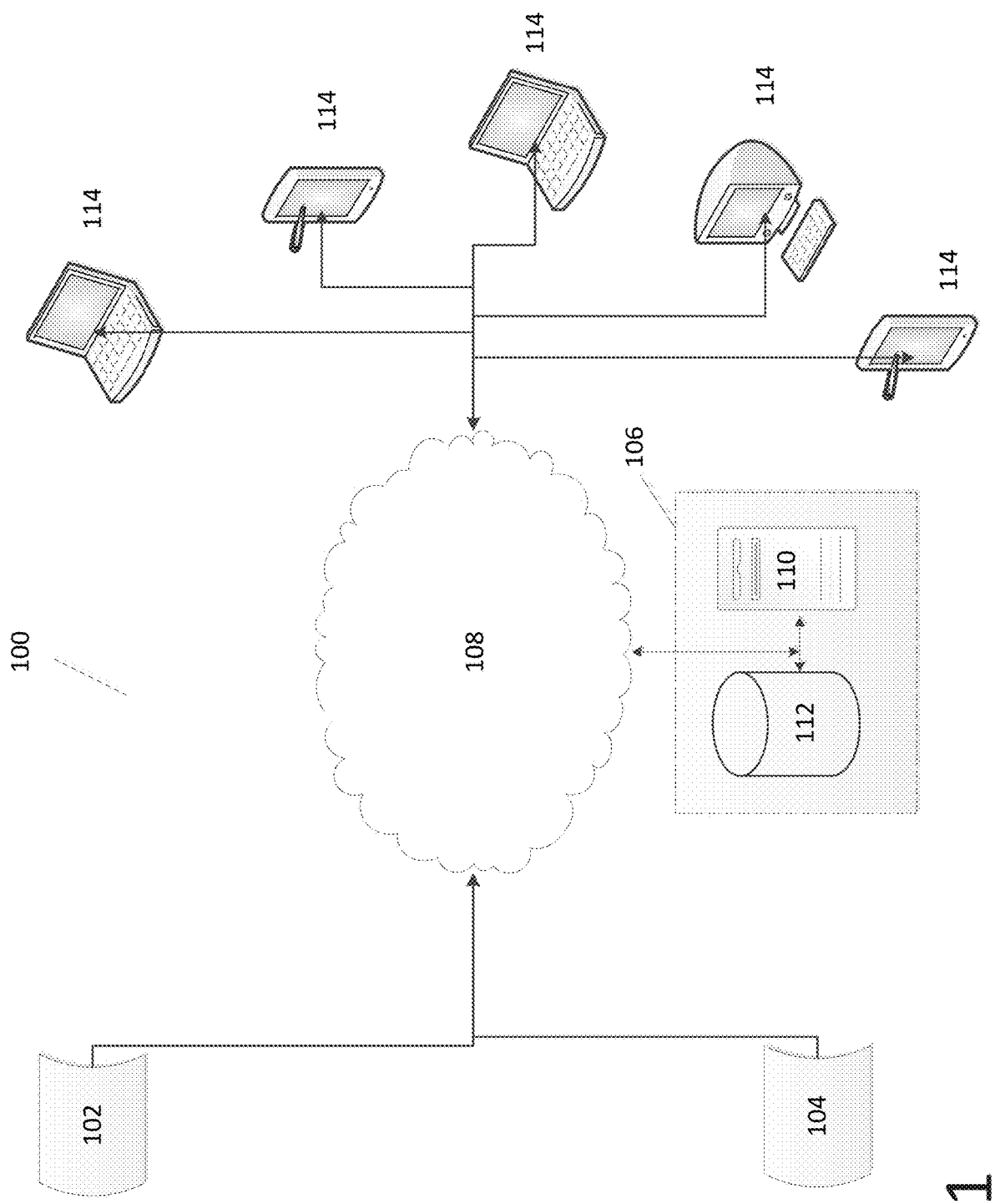
FIG. 1 is schematic representation of an exemplary system configured to facilitate dynamic, severity-based weather peril scoring and providing useful access to same.

FIG. 1 is schematic representation of an exemplary system 100 configured to produce dynamic, severity-based weather peril scores.

The system 100 has two sources (102, 104) of weather-related data, a weather peril scoring system 106, and a plurality of user terminals 114, all coupled together as shown via a network 108 (e.g., the Internet or some other data communication system).

Weather peril scoring refers generally to the characterizing of risk that damage might occur from one or more weather-related perils, such as hail, tornados, rainfall, high winds, etc. In some implementations, the system 100 is configured to focus on weather peril scoring for one particular type of weather-related peril (e.g., hail). In some implementations, the system 100 is configured to perform weather peril scoring for more than one of the different weather-related perils. As an example of the latter type of system 100, the system may perform weather peril scoring for hail and tornados, respectively. In some implementations, the system 100 may be configured to produce a single weather peril score that characterizes the risk that damage might occur from any one of several different weather-related perils (e.g., rain or hail) in a particular geographic region.

In a typical implementation, the system 100 ingests different types of weather-related data, such as, weather-related radar data and data representing weather-related observations by humans. The different types of weather-related data may come from different sources. In various implementations, the system 100 manipulates, blends, and weights the different types of data (e.g., from the different sources) to produce a score, which may be numerical, that represents, for example, the risk that damage might occur in different geographic regions from one or more weather-related perils.

Typically, the peril scores that the system 100 produces are highly accurate. Among other benefits, this highly accurate peril scoring can enable insurance underwriters to better gauge the risk that a damaging weather event might occur at a particular location.

The system 100 typically ingests new weather data as it becomes available (e.g., is released from the data sources) and reformulates the peril scores on periodic basis (e.g., as it receives the new weather data).

In a typical implementation, highly accurate, up-to-date weather peril scores can be delivered to interested parties (e.g., insurance underwriters or others) in a timely, efficient, and user-friendly manner.

The weather peril scoring system 106, in the illustrated implementation, has a computer-based processor 110 and computer-based memory storage 112. In various implementations, the processor 110 can include any number of (e.g., one or more) processors to perform and/or facilitate the various processing functionalities disclosed herein as being attributable to or for the weather peril scoring system 106. Likewise, in various implementations, the memory storage 112 can include any number of (one or more) memory storage devices configured to perform or facilitate one or more of the memory storage functionalities disclosed herein as being attributable to or for the weather peril scoring system 106. The processing functionalities and/or the memory storage functionalities can be aggregated locally or distributed geographically (e.g., across different locations).

The computer-based user interface devices 114, such as laptops, tablets, desktops, etc., are coupled, via the network 108, to the weather peril scoring system 106 and, in some implementations, to one or more (or all) of the sources of weather-related data 102, 104. Consistent with the current disclosure, each computer-based user interface device 114 is configured to enable a human user to access data from and/or interact with the weather peril scoring system 106 and, in some implementations, to one or more (or all) of the sources of weather-related data 102, 104.

Figure 2:
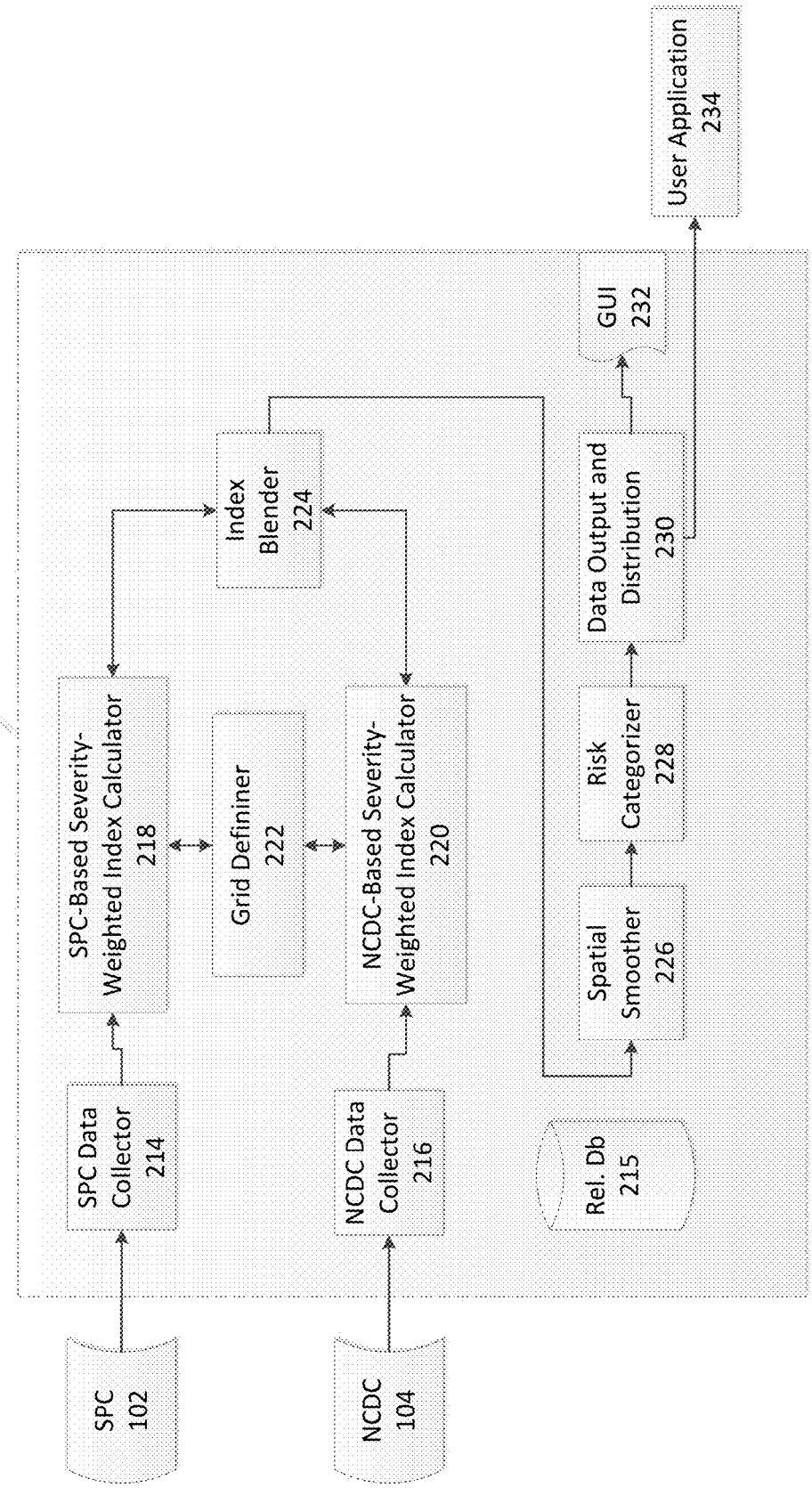
FIG. 2 is a schematic representation of the system of FIG. 1 that includes additional details about a particular exemplary implementation of the weather peril scoring system of FIG. 1 and some of its internal functionalities.

FIG. 2 is a schematic representation of the system 100 of FIG. 1 that includes additional details about a particular exemplary implementation of the weather peril scoring system 106 of FIG. 1 and some of its internal functionalities (as implemented, for example, by the system's processing 110 and/or memory storage 112 functionalities/modules).

The illustrated weather peril scoring system 106 includes a first data collector 214, a second data collector 216, a relational database 215, a first severity-weighted index calculator 218, a second severity-weighted index calculator 220, a grid generator 222, an index blender 224, a spatial smoother 226, a risk categorizer 228, and a data output and distribution module 230.

The illustrated weather peril scoring system 106 is configured to receive weather-related data from a first source of weather-related data 102 and a second source of weather-related data 104. The first source of weather-related data 102 in the illustrated implementation includes servers operated by the National Oceanic and Atmospheric Administration (NOAA)'s Storm Prediction Center (SPC), which may host a series of comma-delimited (CSV) files containing data about human observations of weather-related occurrences, such as hail storms. The second source of weather-related data 104 in the illustrated implementation includes servers hosted by NOAA's National Climate Data Center (NCDC), which releases processed radar-derived observations daily.

The illustrated weather peril system 106 is configured to output data at a graphical user interface (GUI) 232 and/or via a user application 234 accessible from one or more of the user terminals 114.

According to the illustrated implementation, the first data collector 214 is an SPC data collector and is coupled to the external first source of weather-related data 102 (i.e., the SPC). The second data collector 216 is coupled to the external second source of weather-related data 104 (i.e., the NCDC). The first data collector 214 and the second data collector 216 are also coupled to the relational database 215. The first data collector 214 (i.e., the SPC data collector) is coupled to the first severity-weighted index calculator 218 (which, in the illustrated implementation, is an SPC-based severity-weighted index calculator), and the second data collector 216 (i.e., the NCDC data collector) is coupled to the second severity-weighted index calculator 220 (which, in the illustrated implementation, is an NCDC-based severity-weighted index calculator).

The grid definer 222 in the illustrated implementation is coupled to both the first (SPC-based) severity-weighted index calculator 218 and the second (NCDC-based) severity-weighted index calculator 220.

The first (SPC-based) severity-weighted index calculator 218 and the second (NCDC-based) severity-weighted index calculator 220 are coupled to the index blender 224. The index blender 224 is coupled to the spatial smoother 226. The spatial smoother 226 is coupled to the risk categorizer 228. The risk categorizer 228 is coupled to the data output and distribution module 230.

The data output and distribution module 230 in the illustrated implementation is coupled to a GUI 232 and to a user application 234.

Figure 3:
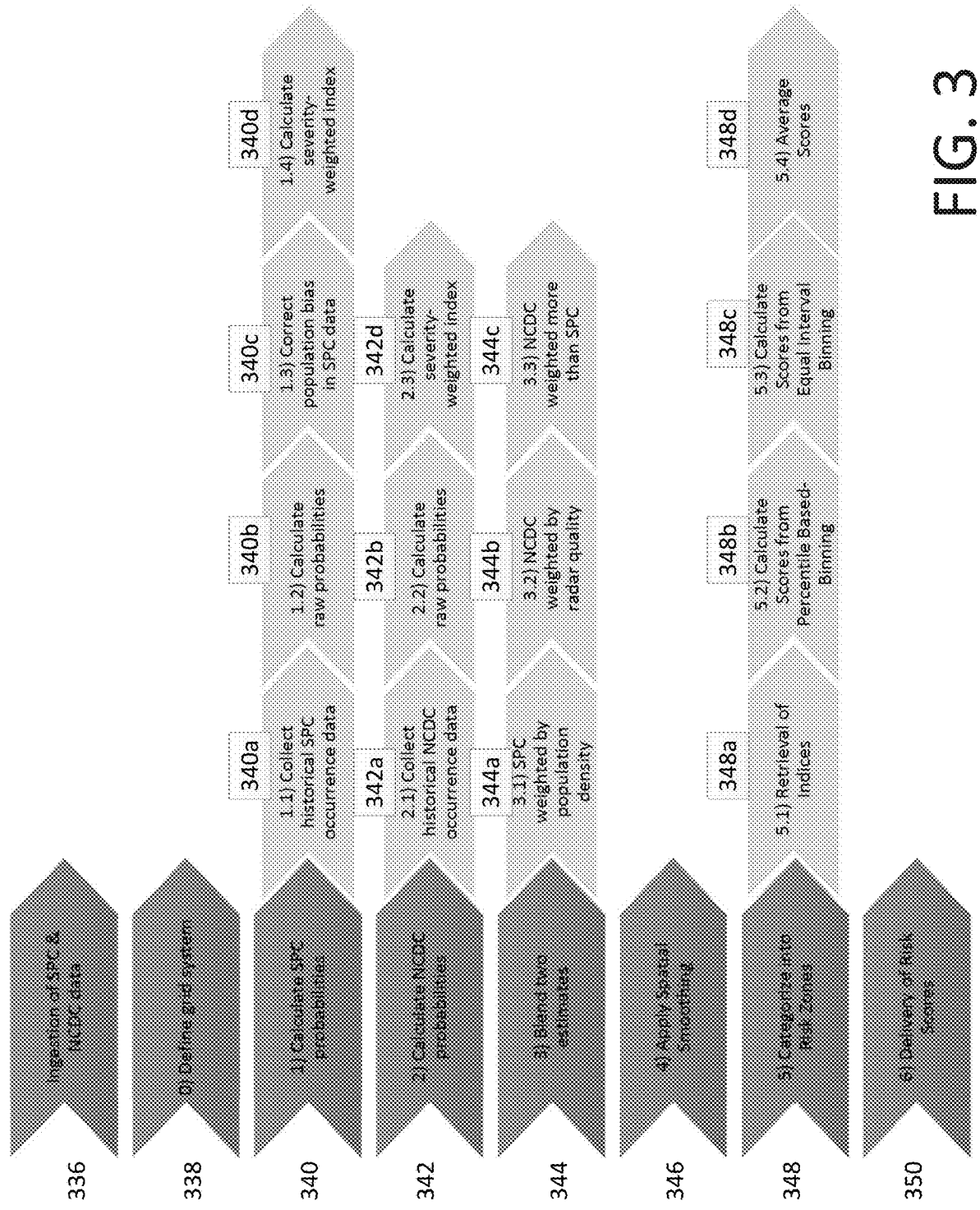
FIG. 3 is a schematic representation of an exemplary process for producing dynamic, severity-based weather peril scores, which may be performed, for example, by the system of FIGS. 1 and 2.

FIG. 3 is a schematic representation of an exemplary process for producing dynamic, severity-based weather peril scores, which may be performed, for example, by system 100.

According to the illustrated representation, the process (at 336) includes ingesting the SPC and NCDC data. In some implementations, the system 100 is configured to clean and/or homogenize the ingested data.

The particular details of any data ingestion may depend in part on the particular data source and/or the particular weather peril associated with the data. For instance, if the associated weather peril is hail (so that the system 100 will be producing hail risk scores), then the data collection component (e.g., SPC data collector 214) of the system 100 may query, over the Internet 108, servers operated by NOAA's Storm Prediction Center (SPC) 102, which generally hosts comma-delimited (CSV) files containing human observations of hail storm occurrences. A bulk download may be initiated to collect historical data related to human observations of hail, followed by subsequent retrieval requests to obtain near-real-time new data related to human observations of hail. In this exemplary embodiment, the historical retrieval component recursively downloads and processes all available files that contained human hail observations.

The system also processes the retrieved data as necessary to conform to the storage and database requirements of the user. In the exemplary embodiment, the system 100 processes SPC CSV files by reformatting metadata to conform with storage requirements for a relational database (e.g., 215 in FIG. 2) for later use. Example reformatting operations include converting all date- and time-related columns into a single date/time column in a standard time zone (e.g., Coordinated Universal Time [UTC]) and converting variable values into standard units.

FIGS. 4A and 4B shows one example of an SPC data set before ingestion and processing (labeled "raw SPC data") and after ingestion and processing (labeled "after ingestion of SPC data"), respectively.

The exemplary data set in FIG. 4A is organized into a table where each row includes a collection of data representing human observations associated with a particular event (e.g., a tornado, etc.), and each column has a header that identifies a particular category in standard SPC tornado, hail, and wind CSV data formatting. More particularly, in the illustrated FIG. 4A table:

the column labeled "om" includes tornado numbers (e.g., from a count of tornados during the year), the columns labeled "yr," "mo," and "dy" includes date information (i.e., year, month, and day, respectively), the column "date" includes the full date (i.e., month, day and year), the column labeled "time" includes time of day information, the column labeled "tz" includes time zone information (where, for example, 3=CST, and 9 would=GMT, etc.), the column labeled "st" includes two letter postal abbreviations for states, the column labeled "stf" includes state Federal Information Processing Standards (FIPS) codes, the column labeled "stn" includes state numbers, the column labeled "mag" includes F-scale values, hail size (e.g., in inches), and/or wind speed (e.g., in knots), the column labeled "inj" includes injuries, the column labeled "fat" includes fatalities, the column labeled "loss" includes estimated property loss information, the column labeled "doss" includes estimated crop loss information, the column labeled "slat" includes starting latitude (e.g., in degrees), the column labeled "slon" includes starting longitude (e.g., in degrees), the column labeled "elat" includes ending latitude (e.g., in degrees), the column labeled "elon" includes ending longitude (e.g., in degrees), the column labeled "len" includes length (e.g., in miles), the column labeled "wid" includes width (e.g., in yards), the columns labeled "ns," "sn," and "sg" includes tornado segment information (including "number of states affected by the tornado," "a state number, where a '1' would indicate, e.g., entire track info in this state," and "a tornado segment number," respectively, and the columns labeled "f1" to "f4" include county FIPS codes.

In some implementations, the details of the raw data, the number of columns, and/or the labeling of columns may of course differ from what is shown in the exemplary table in FIG. 4A.

The exemplary data set in FIG. 4B is organized into a table where each row includes a collection of data representing human observations associated with a particular event (e.g., a tornado, etc.), and each column has a header that identifies a particular category. More particularly, in the illustrated FIG. 4B table:

- the column labeled "datetime" includes data representing dates and times of the corresponding events,
- the column labeled "size" includes a ranking of size, which may be derived from the raw date (including, e.g., the starting and ending longitude and latitude data from FIG. 4A),
- the columns labeled "lat" and "lon" include ending latitude and longitude data,
- the columns labeled "property_loss_dollars" and "crop_loss_dollars," includes dollar values for property loss and crop loss, respectively.

All of the data in the exemplary FIG. 4B table comes from or can be derived from (e.g., mathematically, or by simple reformatting) the raw data in the exemplary FIG. 4A table.

FIGS. 4C and 4D shows one example of an NCDC data set before ingestion (labeled "raw NCDC data") and after ingestion (labeled "after ingestion of NCDC data"), respectively.

The exemplary data set in FIG. 4C is organized into a table where each row includes a collection of radar-collected data, for example, associated with a particular time, and where each column has a header that identifies a particular data type category. More particularly, in the illustrated FIG. 4C table:

- the column labeled "#ztime" includes time information (e.g., based on a world-wide 24-hour clock called Zulu time (Z) or Coordinated Universal Time (UTC),
- the column labeled "lon" includes a longitude (e.g., in degrees) of the event,
- the column labeled "lat" includes ending latitude (e.g., in degrees) of the event,
- the column labeled "WSR ID" includes weather surveillance radar identification codes,
- the column labeled "CELL ID" includes data identifying a cell unique to the radar site,
- the column labeled "range" includes range information for the radar,
- the column labeled "azimuth" includes an azimuth angle for the radar,
- the column labeled "sevprob" includes data indicating probability of a severe weather condition, such as severe hail,
- the column labeled "prob" includes data indicating probability of a particular weather condition (e.g., hail), and
- the column labeled "max size" includes data estimating maximum size of hail.

In some implementations, the details of the raw NCDC data, the number of columns, and/or the labeling of columns may of course differ from what is shown in the exemplary table in FIG. 4C.

The exemplary data set in FIG. 4D is organized into a table where each row includes a collection of data representing radar data collected at particular times, and where each column has a header that identifies a particular category of radar-related data. More particularly, in the illustrated FIG. 4D table:

- the column labeled "timestamp" includes data representing dates and times,
- the column labeled "station id" includes numerical identification codes that identify cells of the geographical grid on which the data is organized (in some implementations, this may be derived from data in FIG. 4C),
- the column labeled "MESH-in" includes data estimating maximum size of hail, which comes from the MAX-SIZE column in FIG. 4C, but with the -999 entry filtered out, for example,
- the column labeled "prob_%" includes data indicating probability of a particular weather condition (e.g., hail), which comes from the "Prob" column in FIG. 4C, but with the -999 entry filtered out, for example,
- the column labeled "posh_%" includes data indicating probability of a severe weather condition, such as severe hail, which comes from the "sevprob" column in FIG. 4C, but with the -999 column filtered out,
- the column "Cell_Id" includes data identifying the cell unique to the radar site, All of the data in the exemplary FIG. 4D table comes from or can be derived from (e.g., mathematically, or by simple reformatting) the raw data in the exemplary FIG. 4C table.

In various implementations, the SPC data, the SPC-derived data, the NCDC data, and/or the NCDC-derived data are stored in a relational database (e.g., 215 in FIG. 2).

Referring again to the exemplary FIG. 3 process, next, the grid generator 222 of system 100 (at 338) generates a grid for a map of a relevant geography (e.g., the United States).

In a typical implementation, the system 100 calculates and delivers peril scores in, or at least based on, a grid format. In this regard, the scores can be delivered cell-by-cell in a granular fashion, rather than on a city-wide, state-wide, or region-wide basis. In an exemplary embodiment, the grid generator 222 maps a geodesic (hexagonal) grid with a 15-kilometer resolution over the United States, though in other embodiments different cell shapes and sizes and different geographical areas could be utilized instead. Moreover, in an exemplary embodiment, the grid generator 222 generates the locations of the centroids of the geodesic cells using a function from the SPHEREPACK™ open-source software library. The SPHEREPACK™ open-source software library is a collection of FORTRAN77 programs and subroutines facilitating computer modeling of geophysical processes. Moreover, the grid generator 222 typically generates the hexagonal boundaries of the geodesic cells by performing the geometrical calculations to define the boundaries of the hexagons in latitude and longitude coordinates, matching the resolution and orientation of the hexagons with the cell centroids.

In a typical implementation, grid generation (at 338) results in a map or model (e.g., of the United States) with a geodesic grid laid upon it, where the geodesic grid defines a plurality of cells, each of which corresponds to a respective geographical region of the mapped area.

Next, according to the process represented in FIG. 3, the system 100 (at 340) calculates severity-weighted risk indices based on the SPC and/or SPC-derived data. In a typical implementation, these SPC-based severity-weighted risk indices are calculated by, or at least in conjunction with, the SPC-based severity weighted index calculator 218 of the system 100. In this regard, the system 100 typically calculates one SPC-based severity risk index, per weather peril, for each respective one of the cells in the geodesic gird. Each SPC-based severity risk index quantifies a measure of risk that damage may occur in a geographic region that corresponds to the associated cell of the geodesic grid, based on the SPC data and/or the SPC-derived data.

According to the illustrated implementation, calculating the SPC-based severity-weighted risk indices includes collecting historical SPC data (at 340a), calculating raw probabilities (of certain weather perils or damage from certain weather perils) based on the SPC data (at 340b), correcting the raw probabilities to account for population bias (at 340c), and, finally, calculating the actual SPC-based severity-weighted risk indices based on the corrected probabilities (at 340d).

In a typical implementation, collecting historical SPC data (at 340a) involves the system 100 (e.g., the SPC-based severity-weighted risk index calculator 218 of the system 100) queries the relational database 215 for all historical SPC-based data relating to the associated weather peril within a particular geographical region (e.g., within a particular distance of each grid cell centroid. The SPC-based severity-weighted risk index calculator 218 receives data in response to the query and categorizes that data according to severity/potential to cause damage.

In one exemplary implementation, to calculate a hail risk score, the SPC-based severity-weighted risk index calculator 218 calculates the probability of hail events by severity category for all grid cell centroids within a region of interest (such as the fifty United States), though in other embodiments, the probability could be calculated on different geographical areas. In this example, the SPC-based severity-weighted risk index calculator 218 queries the relational database on which peril data is stored for all historical data of human-observed hail as collected from SPC for the locations within 50 km of a given grid cell centroid. The SPC-based severity-weighted risk index calculator 218, in this example, then categorizes hail occurrences by hail size (e.g., less than 0.75" in diameter, 0.75-1", 1-2", 2-3", and 3+"), which is a proxy for the severity and damaging potential of the event. In other implementations, the SPC-based severity-weighted risk index calculator 218 categorizes other perils in a similar fashion based on intensity (severity/potential to cause damage). For example, in one implementation, the SPC-based severity-weighted risk index calculator 218 categorizes intense rainfall by hourly rainfall accumulation (0.75-1" rainfall per hour, 1-1.5", 1.5-2", 2+"), which corresponds in the meteorological literature to reasonable approximation of risk of localized flooding. In other implementations, tornadic storm data is categorized according to the Enhanced Fujita scale, (EF0, EF1, EF2, EF3+) which again mirrors closely potential for property damage and personal injury. In fact, the Enhanced Fujita scale (EF-Scale) specifically rates intensity of tornadoes in the United States and Canada based on the damage they cause.

In a typical implementation, after categorization, the system calculates raw probabilities (of certain weather perils or damage from certain weather perils) based on the SPC data (at 340b). In some implementations, this includes calculating the probabilities of weather events happening at different severity levels. The SPC-based severity-weighted risk index calculator 218 may perform this calculation by counting the number of events (e.g., of a particular kind) that have happened over a particular period of time, and fitting those events to a uniform probability distribution based on intensity (severity/potential to cause damage). The particular period of time may be virtually any period of time, including, for example, all time (i.e., corresponding to all available data), or some human-user specified period of time. In a typical implementation, for newer data sets (e.g., with fewer numbers of occurrences), the system 100 may give the resulting SPC-based probability calculations less weight in the final peril score calculation, as discussed below.

FIG. 4E shows one example of a data snapshot following calculation of probabilities for various categories of hail.

The exemplary data snapshot in FIG. 4E is organized into a table where each row includes a collection of data associated with a particular grid ID, and each column has a header that identifies a particular category.

More particularly, in the illustrated FIG. 4E table:
the column labeled "Grid ID" includes numerical identification codes that identify cells of the geodesic grid,
the column labeled "counts" includes data indicating how many of a particular type of weather-related event has happened (i.e., has been recorded) at a corresponding one of the grids over a particular period of time,
the columns labeled "Prob_c1," "Prob_c2," "Prob_c3," and "Prob_c4" provide, for each grid location, a probability that a weather-related event having a particular intensity (severity/potential to cause damage) will occur in any 12-month (i.e., annual) time period. More particularly, in the illustrated example, "Prob_c1" is the probability that a weather-related event in a first range of intensities will happen, "Prob_c2" is the probability that a weather-related event in a second range of intensities will happen, "Prob_c3" is the probability that a weather-related event in a third range of intensities will happen, and "Prob_c4" is the probability that a weather-related event in a fourth range of intensities will happen.

Next, according to the illustrated implementation, after calculating the raw weather peril probabilities, the SPC-based severity-weighted risk index calculator 218 (at 340c) performs a series of bias and error correction steps.

In this regard, the SPC-based severity-weighted risk index calculator 218 may perform a population bias correction for the calculated raw weather peril probabilities. In a typical implementation, the population bias correction overcomes, or addresses, a phenomenon whereby higher population areas tend to generate higher numbers of human observations of weather events, whereas lower population areas tend to generate lower numbers of human observations of weather events. In this regard, the SPC-based severity-weighted risk index calculator 218 may begin its population bias correction by collecting population figures for a geographic area for which a risk score is being calculated, and then calculating a population density (e.g., number of people per square mile). In an exemplary embodiment, the system 100 may query the United States census servers for up-to-date population figures, calculate a population density for the U.S. county or counties that correspond to (e.g., overlap with) the cell in question, and map that U.S. county population density (or a mix thereof) to the centroid of the cell in question based on geographical overlap. In a typical implementation, the system 100 may store (e.g., in a temporary storage medium, such as RAM in computer-based memory 112) the population density, and/or other associated data.

With the population density stored in some sort of temporary data storage medium, the SPC-based severity-weighted risk index calculator 218 implements a bias correction methodology. The methodology can take different forms, but in an exemplary embodiment, the SPC-based severity-weighted risk index calculator 218 calculates a correction factor that is generally inversely proportional to the population density of the area in question. In particular, the formula is generally of the form: population bias correction factor=ln(C1+x)/C2, where "ln" is the natural logarithm, "C1" and "C2" are constants, and "x" is the population density normalized by a minimum density value. More particularly, the value of the constant "C1" may be set to 10, and the value of the constant "C2" set such that the maximum value of the correction factor is equal to 1. At very low population densities, a particular value for C2 may be applied to account for a "breakpoint," (see, e.g., Elsner et al. (2013), *The Decreasing Population Bias in Tornado Reports across the Central Plains*, Weather, Climate, and Society, 5), or the notion that under a certain population level, weather phenomena are severely under-reported by human observations. In an exemplary embodiment, this regional value of the constant "C2" may be set to 0.6 times the original value of "C2."

After applying the population bias correction, the bias correction factor is "tuned" to eliminate so-called hot spots, areas around high population centers that report much higher peril risk probabilities than immediately surrounding areas, with no geophysical basis for a difference in risk. This tuning is performed by selecting initial values for constants "C1" and "C2" above, calculating the resulting bias-corrected probability values and visualizing them on a map-based graph, visually evaluating for presence of hot spots, and adjusting the constants "C1" and "C2" as needed until the hot spots are eliminated.

In various implementations, the system 100 may engage in one or more other correction steps depending, for example, on the data source and/or peril type. In one exemplary embodiment, a similar population bias correction is applied to human observed tornado data for use in tornado peril scoring and to human observed wind data for using in wind peril scoring. Other bias corrections in exemplary embodiments include adjusting reanalysis climate data to account for known underestimation of hourly intense rainfall amounts and instantaneous wind speeds, for use in intense rainfall and wind peril scoring.

In a typical implementation, the system 100 stores (e.g., in a temporary storage medium, such as RAM in memory 112), the error and/or bias corrected probabilities for use by the system 100 in one or more later steps.

FIG. 4F shows one example of a data snapshot following implementation of a population bias correction step.

The exemplary data snapshot in FIG. 4F is organized into a table where each row includes a collection of data associated with a particular grid ID, and, and each column has a header that identifies a particular category.

More particularly, in the illustrated FIG. 4F table:
the column labeled "Grid ID" includes numerical identification codes that identify cells of the geodesic grid,
the column labeled "Pop. Factor" includes a population bias correction factor for each cell, and
the columns labeled "Prob_c1," "Prob_c2," "Prob_c3," and "Prob_c4" provide, for each grid location, a population bias corrected probability that a weather-related event having a particular intensity (severity/potential to cause damage) will occur. In general, each of these probabilities is calculated by dividing a corresponding raw SPC probability (from a corresponding one of the entries in the FIG. 4E table) by the associated population factor.

After population bias and/or other error corrections, the SPC-based severity-weighted risk index calculator 218 (at 340d) calculates, for each cell, a severity-weighted risk index. In a typical implementation, this calculation is performed by weighting the probability of more severe events more heavily than the probably of less severe events.

As an example, the system 100, in this regard, may be configured to recognize, and accommodate the fact that larger hail stones have higher impact energies than smaller hail stones (see, e.g., Sidney H. Greenfield, NBS 23, "Hail Resistance of Roofing Products," National Bureau of Standards, August 1969). Thus, in calculating a hail risk index (for example) for a particular grid cell, the SPC-based severity-weighted risk index calculator 218 may weight the probabilities of larger hail stones more heavily than the probabilities of smaller hail stones, with the weights assigned being directly proportional to the impact energy as estimated from the size of the hailstone. The formula for the hail risk index, r, for example, may be defined as follows:

$$r = \sum_{i=1}^{4} \frac{1}{2} m_i (v_i)^2 p_i$$

$$\text{where } m_i = 8.58025 \, d_i^3 \left(0.95 - \frac{0.0787402}{d_i}\right)$$

$$\text{and } v_i = 3.75 \sqrt{\frac{4m_i}{d_i^2} + \frac{m_i}{5d_i}}$$

where $d_i$, $m_i$, $v_i$, and $p_i$ are the hail diameter, estimated mass, estimated velocity, and probability associated with category i, respectively. The formula for other weather perils such as tornados may be defined with an exponential formula as follows:

$$r = \sum_{i=1}^{4} (2)^i p_i$$

where $p_i$ is the probability associated with category i.

In a typical implementation, the system 100 stores the calculated severity-weighted risk indices in a temporary storage medium (e.g., RAM in memory 112).

FIG. 4G shows one example of a data snapshot following creation of severity-weighted indices for hail risk based on SPC data for each grid-ID.

The exemplary data snapshot in FIG. 4G is organized into a table where each row includes a collection of data associated with a particular grid ID, and, and each column has a header that identifies a particular category.

More particularly, in the illustrated FIG. 4G table:
the column labeled "Grid ID" includes numerical identification codes that identify cells of the geodesic grid,
the column labeled "Pop. Factor" includes a population bias correction factor for each cell,
the columns labeled "Prob_c1," "Prob_c2," "Prob_c3," and "Prob_c4" provide, for each grid location, a population bias corrected probability that a weather-related event having a particular intensity (severity/potential to cause damage) will occur,
the column labeled "Risk Index" provides a risk index r (as calculated per the above-referenced formula, for example) for each grid ID.

Utilizing the same (or similar) steps as those described above, the system 100 can then calculate similar indices for other data sources (e.g., the NCDC), or calculate them simultaneously/in parallel. In an exemplary embodiment, for example, the system 100 calculates another severity-tied hail risk index, using the same size categories of hail stones described above, as derived from radar data from the NCDC.

In other embodiments, and other weather perils, the system 100 calculates risk indices from other data types, such as weather station data or reanalysis model information.

More particularly, in the process represented in FIG. 3, the system 100 (at 342) calculates severity-weighted risk indices based on NCDC and/or NCDC-derived data. In a typical implementation, these NCDC-based severity-weighted risk indices are calculated by, or at least in conjunction with, the NCDC-based severity weighted index calculator 220 of the system 100. In this regard, the system 100 typically calculates one NCDC-based severity risk index, per weather peril, for each respective one of the cells in the geodesic gird. Each NCDC-based severity risk index quantifies a measure of risk that damage may occur in a geographic region that corresponds to the associated cell of the geodesic grid, based on the NCDC data and/or the NCDC-derived data.

According to the illustrated implementation, calculating the NCDC-based severity-weighted risk indices includes collecting historical NCPC data (at 342a), calculating raw probabilities (of certain weather perils or damage from certain weather perils) based on the NCDC data (at 342b), and, finally, calculating the actual NCDC-based severity-weighted risk indices based on the corrected probabilities (at 342d).

In a typical implementation, collecting historical NCDC data (at 342a) involves the system 100 (e.g., the NCDC-based severity-weighted risk index calculator 220 of the system 100) querying the relational database 215 for all historical NCDC-based data relating to the associated weather peril within a particular geographical region (e.g., within a particular distance of each grid cell centroid). The NCDC-based severity-weighted risk index calculator 220 receives data in response to the query and categorizes that data according to severity/potential to cause damage.

In one exemplary implementation, to calculate a hail risk score, the NCDC-based severity-weighted risk index calculator 220 calculates the probability of hail events by severity category for all grid cell centroids within a region of interest (such as the fifty United States), though in other embodiments, the probability could be calculated on different geographical areas.

In a typical implementation, after categorization, the system 100 calculates raw probabilities (of certain weather perils or damage from certain weather perils) based on the NCDC data (at 342b). In some implementations, this includes calculating the probabilities of weather events happening at different severity levels. The NCDC-based severity-weighted risk index calculator 220 may perform this calculation by counting the number of events (e.g., of a particular kind) that have happened over a particular period of time, and fitting those events to a uniform probability distribution based on intensity (severity/potential to cause damage).

Next, according to the illustrated implementation, the NCDC-based severity-weighted risk index calculator 220 (at 342d) calculates, for each cell, a severity-weighted risk index. In a typical implementation, this calculation is performed by weighting the probability of more severe events more heavily than the probably of less severe events.

FIG. 4H shows one example of a data snapshot following creation of severity-weighted indices for hail risk based on NCDC data for each grid-ID.

The exemplary data snapshot in FIG. 4H is organized into a table where each row includes a collection of data associated with a particular grid ID, and, and each column has a header that identifies a particular category.

More particularly, in the illustrated FIG. 4H table:
the column labeled "Grid ID" includes numerical identification codes that identify cells of the geodesic grid,
the column labeled "Radar Quality Factor" includes a quality factor associated with the corresponding NCDC radar data, obtained by normalizing radar beam height data provided by NCDC,
the columns labeled "Prob_c1," "Prob_c2," "Prob_c3," and "Prob_c4" provide, for each grid location, a probability that a weather-related event having a particular intensity (severity/potential to cause damage) will occur,
the column labeled "Risk Index" provides a risk index (as calculated based on the same sort of formula as provided above, for example) for each grid ID.

Referring again to FIG. 3, according to the represented process, the system 100 (e.g., the index blender 224 of system 100) (at 344) blends the severity-weighted risk indices.

In a typical implementation, after all of the risk indices from all of the sources for a peril of interest are calculated, the system 100 calculates a single risk index. Specifically, in this regard, the system 100 retrieves all available risk indices from temporary storage and then blends them by weighted averaging. The system 100 in this regard may adjust the weights (at 344a, 344b) to account for the quality of the data (e.g., in view of population densities and/or radar qualities). Moreover, the system 100 (at 344c) generally weights NCDC-based data more heavily than SPC-based data. Data quality may be assessed internally by the system 100 or the system 100 may ingest and rely upon external quality assessments.

In an exemplary embodiment, for hail risk scoring, the system 100 weights risk indices derived from SPC human observer data more heavily in grid cells with a higher population density, because human observer data from areas with higher population density tends to be more accurate than such data from lower density areas, even after population bias correction. At the same time, in the exemplary embodiment, for hail risk scoring, the system 100 weights radar data from NCDC more heavily when the radar data is of very high quality as measured by radar beam height data provided by NCDC.

FIG. 4I shows one example of a data snapshot after the blending of SPC and NCDC severity-weighted hail risk indices The exemplary data snapshot in FIG. 4I is organized into a table where each row includes a collection of data associated with a particular grid ID, and each column has a header that identifies a particular category.

More particularly, in the illustrated FIG. 4I table:
the column labeled "Grid ID" includes numerical identification codes that identify cells of the geodesic grid,
the columns labeled "Prob_c1," "Prob_c2," "Prob_c3," and "Prob_c4" provide, for each grid location, a blended (SPC and NCDC) probability that a weather-related event having a particular intensity (severity/potential to cause damage) will occur,
the column labeled "Risk Index" provides a blended risk index (by blending risk indices calculated based on the same sort of formula as provided above, for example) for each grid ID.

In some implementations, the system 100 is configured to assign weights based on how the quality of the data sources for a particular peril as compared to one another. In the exemplary embodiment, for example, in calculating a hail risk score the system 100 (e.g., the index blender 224), weights NCDC radar more heavily than SPC human observer data, because the NCDC data is generally more recent (e.g., beginning in 2009) and more comprehensive than the SPC data. As another example, in calculating a wind risk score, the system 100 (e.g., the index blender 224) weights SPC human observer data more in grid cells with a higher population density, as in the case of hail, and it weights ground station data more for stations that have longer and more complete (gap-free) temporal record, because the probability distribution fitting is more accurate with more complete data.

Next, according to the process represented in FIG. 3, the system 100 (e.g., the spatial smoother 226 of system 100) applies a smoothing (at 346) to the severity-weighted risk indices. In a typical implementation, the spatial smoothing step for a given cell involves recalculating the risk value as a statistical average of the risk value for that given cell and the risk values of all the grid cells within a certain distance (e.g., 200 km, 100 km, 50 km, 25 km, etc., for example) of the given cell. This smoothing reduces spatial differentiation of risk across short geographical distances, where geophysical sources of different risk levels are not expected to exist. The distance scale of the smoothing can be tuned (automatically or by a human user) for each peril separately, and can also vary for different geographical regions for the same peril (e.g., depending on geographical features of each region). In wind peril scoring, for example, the distance scale for smoothing may be shorter in mountainous regions (where risk levels can differ widely from one grid cell to the next due to the effects of terrain) than in flatter regions. For example, a 100 km wind peril smoothing scale may be used over plains regions (defined using a threshold on elevation values, for example), while a 33 km smoothing scale may be used over mountainous regions (above the elevation threshold cutoff).

After smoothing, the system may store the smoothed risk indices in the relational database 215.

Next, in the exemplary FIG. 3 process, the system 100 (e.g., the risk categorizer 228 of system 100) (at 348) categorizes (or bins) each cell into a risk zone. According to the illustrated process, the risk categorizer 228 performs this task by retrieving (at 348*a*) the (smoothed) risk indices, calculating scores (at 348*b*) from percentile-based binning, calculating scores (at 348*c*) from equal interval binning, and producing average scores (at 348*d*).

In a particular implementation, once single severity-weighted risk indices are calculated, and smoothing is applied (if needed), for all the cells in a given geographic area, the system 100 (e.g., the risk categorizer 228 of system 100) retrieves the indices from the relational database 215 on which they are stored and groups or bins the indices to provide a relative ranking of risk for the various cells. In an exemplary embodiment, the system groups these indices into bins numbered 1 through 10 (indicating various degrees of risk), though in other embodiments, indices could be group into smaller or larger numbers of bins and/or use other descriptors for the bins, such as color codes, words (e.g., low risk, medium risk, high risk), alphanumeric codes, etc.

Binning of data can be accomplished, by the risk categorizer 228, in a variety of ways. For example, data may be binned such that an equal amount of data is grouped in a bin. Another methodology is to set bin thresholds such that there are equal intervals between the lowest index value and the highest. According to the illustrated implementation, the system 100 uses both methodologies and blends the results to come up with a more robust risk peril score. Thus, in an exemplary embodiment, the system 100 (at 348*b*) sets the bin thresholds such that 10% of the indices fall into each bin, and tags each index with the appropriate bin number as a score. Additionally, in that exemplary embodiment, the system 100 sets bin thresholds so that there are 10 equal intervals (at 348*c*) and then tags each index with the appropriate bin number as a score. To come up with a final score, the two scores are averaged (at 348*d*)—which can be a straightforward average or can be a weighted average. In some implementations, the system 100 can weight the average toward one binning paradigm or another based on a variety of factors, including, for example, fidelity to historically reliable risk maps, ease of use by end users, and/or mapping functionality.

The system 100 then stores the score (i.e., the average score produced at step 348*d*) for each cell in the relational database 215 for later extraction and/or distribution to end users.

FIG. 4J shows one example of a data snapshot after spatial smoothing and binning into risk zones.

The exemplary data snapshot in FIG. 4J is organized into a table where each row includes a collection of data associated with a particular grid ID, and, and each column has a header that identifies a particular category. More particularly, in the illustrated FIG. 4J table:

- the column labeled "Grid ID" includes numerical identification codes that identify cells of the geodesic grid,
- the columns labeled "Prob_c1," "Prob_c2," "Prob_c3," and "Prob_c4" provide, for each grid location a probability that a weather-related event having a particular intensity (severity/potential to cause damage) will occur,
- the column labeled "Risk Index" provides a smoothed risk index for each grid ID, and
- the column labeled "Zone" provides a risk score (or "peril score") (e.g., on a scale from 1 to 10) for each cell. The risk zones are based on a (possibly weighted) average of scores assigned using two different risk binning approaches as described above.

In one exemplary embodiment, the outputted peril scores are stored in the relational database 215, which may be a PostgreSQL database hosted through a cloud-based hosting service. The data may be accessed through applications servers 234 using queries identifying a particular location, peril or both.

A variety of methods may be used to optimize the interaction between the application servers and queries to the database, depending on the types of servers and database utilized. For example, in one exemplary embodiment, the applications servers 234 are Java based and interact with data more efficiently by utilizing a Hibernate data mapping layer.

Access to the data can be provided in a variety of ways. One exemplary embodiment allows a user to hit a RESTful (representational state transfer) API (application program interface) endpoint to retrieve the data through Java based database queries. These API endpoints may be available for both the final risk scores as well as the underlying probability data.

Data may be returned through these endpoints in a variety of formats.

The system may include a Graphical User Interface ("GUI")—e.g., 232 in FIG. 2, and/or may include the ability to output data to the GUI 232, which allows one or more (or all) of the following: visualization of the data over a map, with color-coded cells, categorized by peril scores, and with user-friendly toggling between types of perils, for example.

The GUI 232 may include a user-facing computer rendered interface, hosted either locally on a user's computer or workstation or remotely. In the case of local GUIs, the GUI may include a feature to query the relational database 215 containing the perils scores, which could be similar to one exemplary embodiment's ability to allow a user to hit REST endpoints to retrieve data through Java-based database queries.

If the GUI 232 is hosted remotely, the user may access the GUI 232 through a communications device connected to the remote host. In one exemplary embodiment, the data is displayed to a user through an in-browser web application, built in HTML, CSS and Javascript and/or using the Map-Box map interface. The user can choose between various weather perils and geographic areas to review risk scores for grid cells in that geographic area. In one exemplary embodiment, the grid cells are color-coded to indicate risk level. In some implementations, the user can choose a particular grid cell to review all the peril scores for that particular cell.

Figure 5:
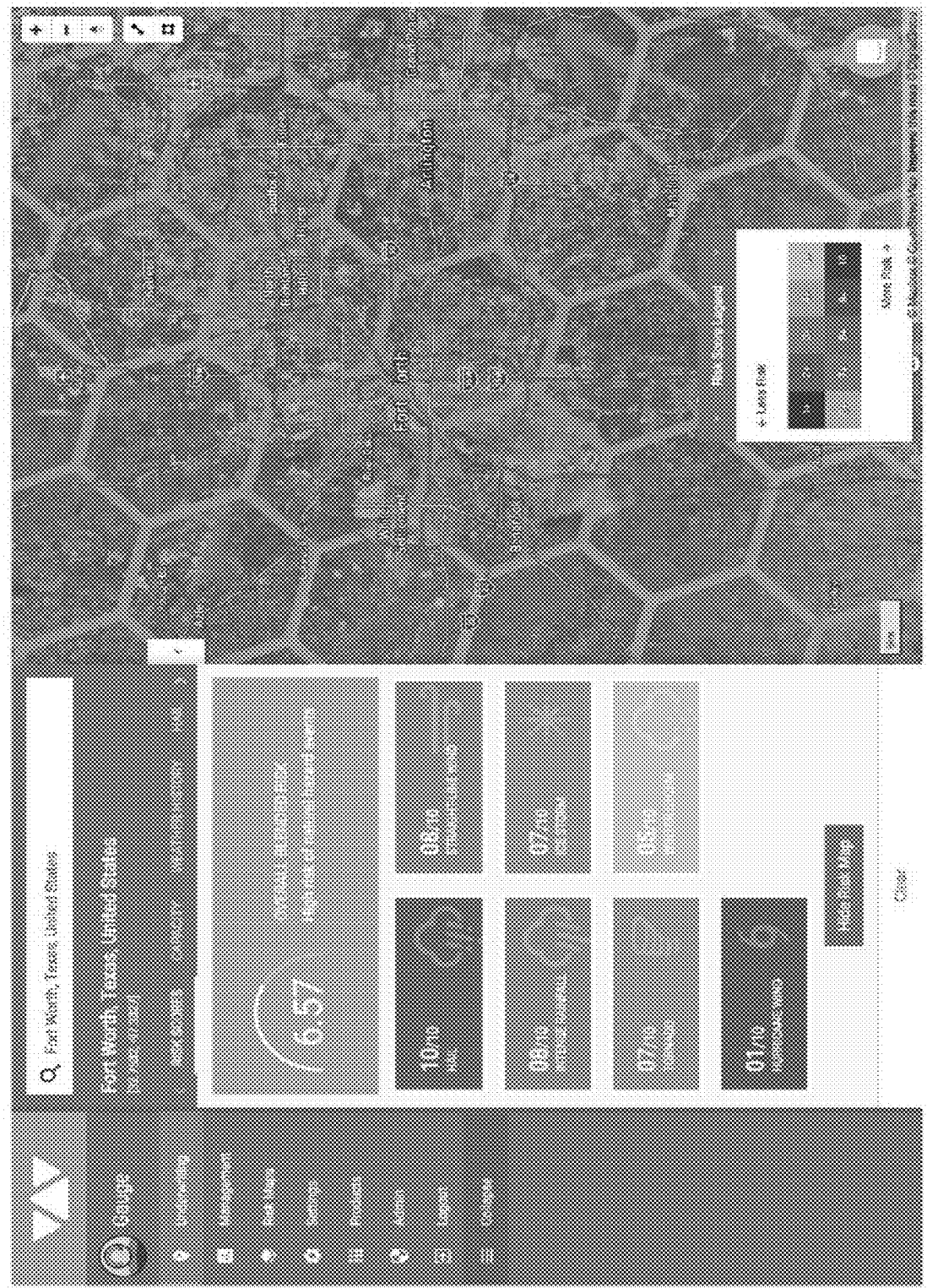
FIGS. 5 to 9 show exemplary screenshots that may be output to a user device or presented at a graphical user interface by the system of FIG. 1.

FIG. 5 is an exemplary screenshot that the system 100 may present to a user at GUI 232. The illustrated screenshot includes a listing of selectable functions that the user can access at the left side of the screen (including underwriting, management, risk maps, settings, products, admin, logout, and collapse). The illustrated screenshot also includes a map, that includes Fort Worth, Tex., United States, at a right side of the screen. There is an overlay of a grid system onto the map that is color-coded to show the overall blended risk (e.g., for the cells in the illustrated grid). The center of the screenshot shows a risk score for multiple different weather perils for Fort Worth, including hail (10/10), straight line wind (08/10), intense rainfall (08/10), ice storm (07/10), tornado (07/10), winter storm (05/10), and hurricane (01/10). There is also a blended risk score for all perils (6.57), which is calculated by averaging (or weighted averaging) all of the individual, peril-specific risk scores.

In a typical implementation, the user may be able to select any one of the indicated perils (e.g., tornados) and have the system 100 provide essentially the same overlay grid, color-coded differently to indicate per cell risk scores for tornados.

Figure 6:
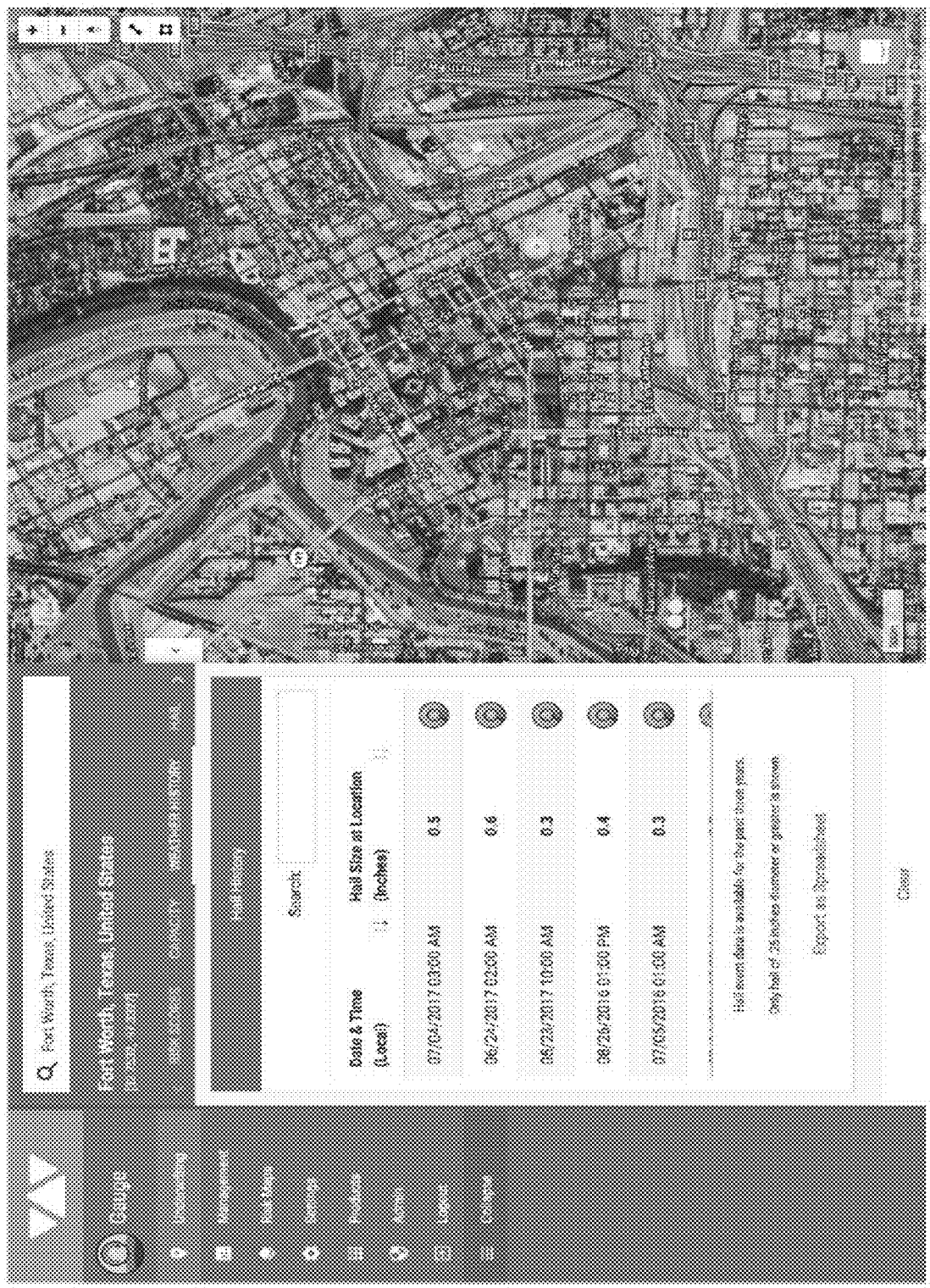

In an exemplary embodiment, the GUI 232 also gives the user the ability to retrieve historical weather data for a particular cell (see, e.g., the "weather history" button on the screenshot of FIG. 5) to compare the risk score with actual peril incidences. FIG. 6 shows a screenshot that the system 100 produces at GUI 232 in response to the user selecting the "weather history" button to receive actual incidents of hail at the same location displayed in FIG. 5. Peril specific information can easily be accessed by toggling to that peril, and, typically, will include a display of annual probabilities of occurrence, count of events, and the probability of events occurring during specific months or at specific severity levels. The map in FIG. 6 is a satellite-view of Fort Worth and does not include the grid overlay that appeared in FIG. 5.

Figure 7:
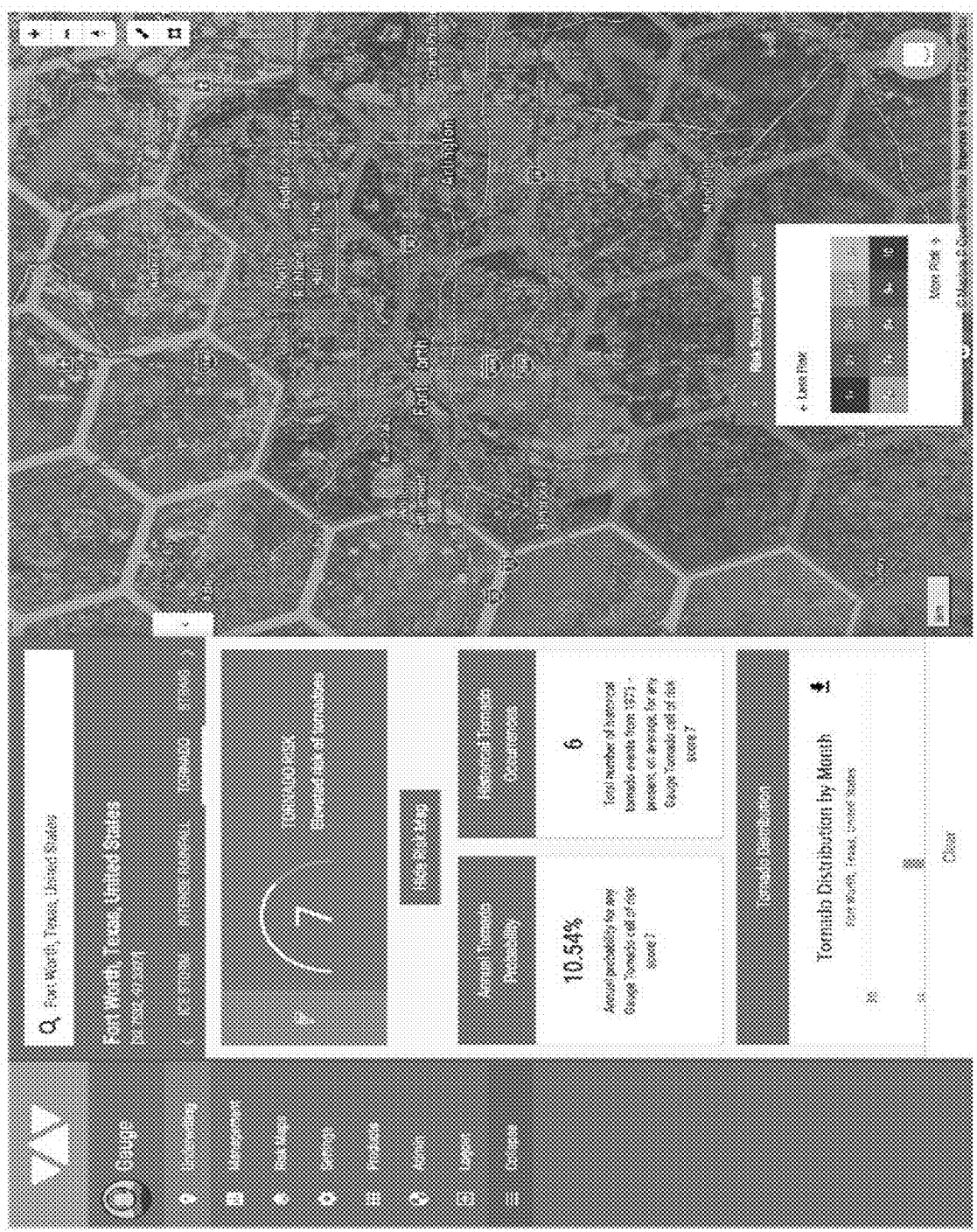
Figure 8:
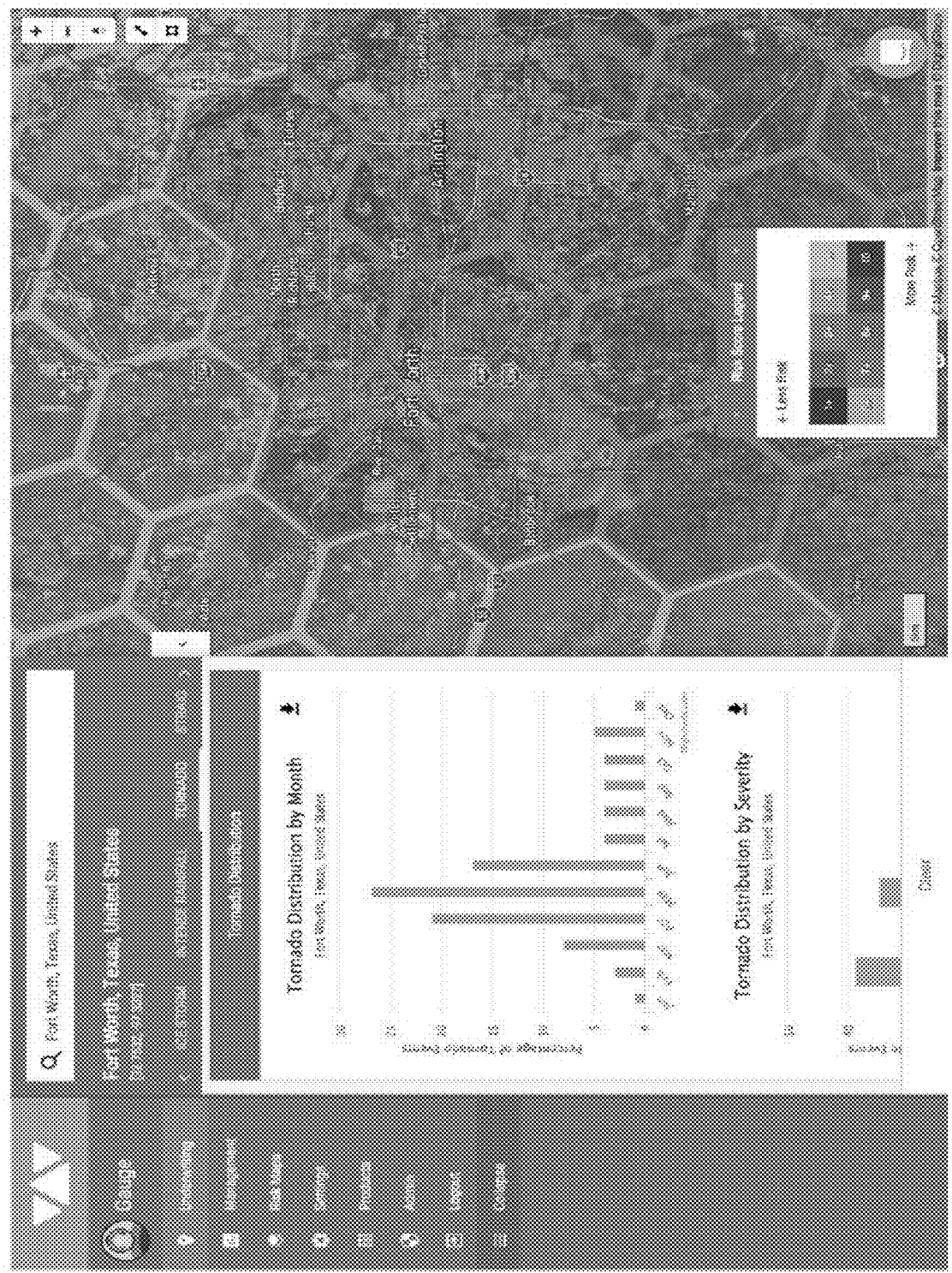
Figure 9:
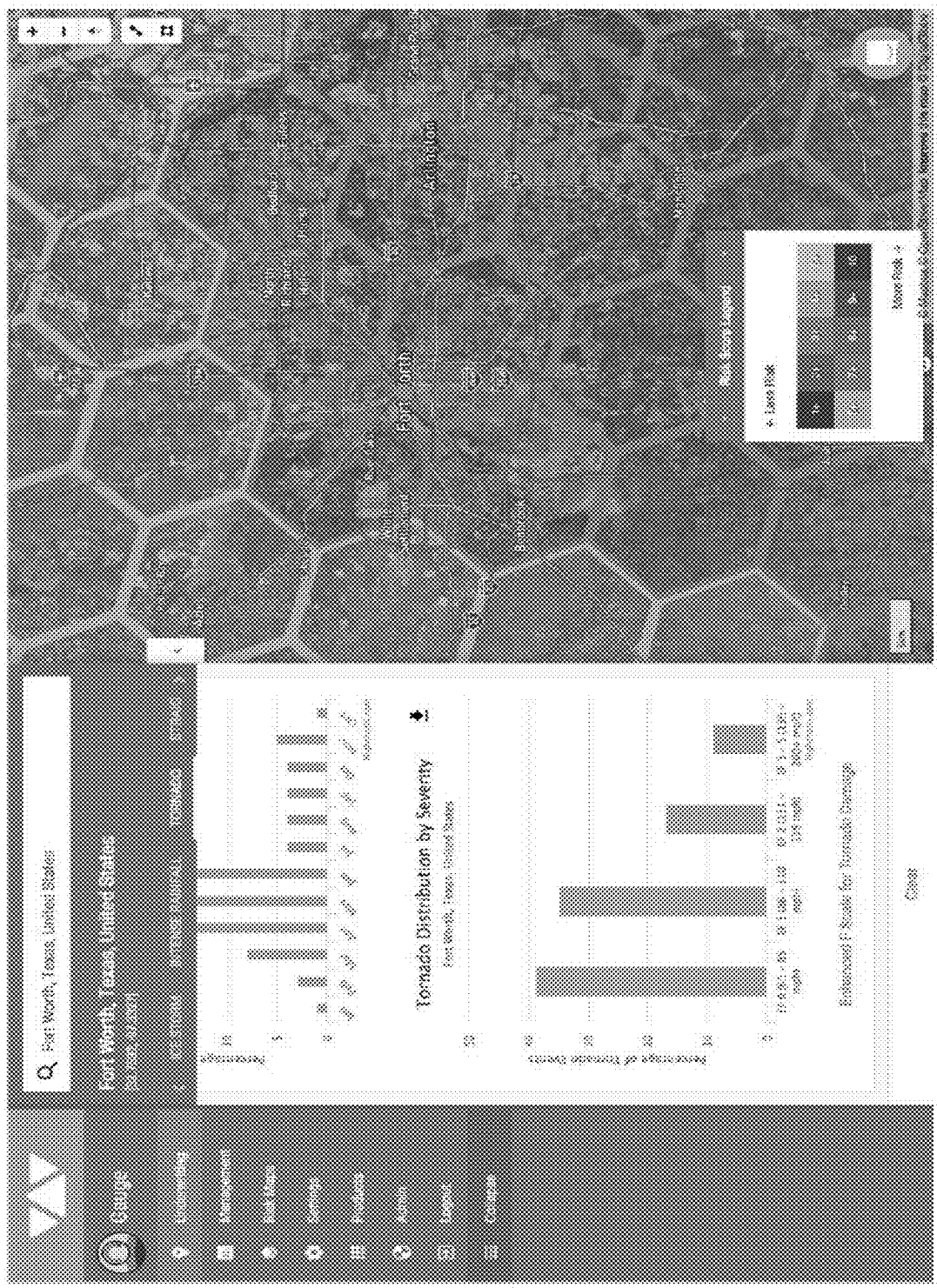

FIGS. 7-9 illustrate the selection of the tornado peril within the GUI 232 and the display of such information. Additional information can be provided for specific perils, such as a chart comparing hail size to everyday objects or tornadoes caused by hurricane wind. The GUI 232 also provides the user with the ability to overlay other information over peril maps. In the exemplary embodiment, for example, the GUI 232 gives the user the ability to import location-based insurance policy exposure data. The system 100 in some implementations, can calculate total insured values for each cell and measure against the total budget available for that cell. The GUI 232 also gives the user the ability to outline an area on a map interface and view the insured locations in and total insured value of that area. These locations can be filtered and exported for further action.

A number of embodiments have been described. Nevertheless, it will be understood that various modifications may be made without departing from the spirit and scope of what has been disclosed.

For example, the System may receive input information from one or more of a variety of different sources (governmental or private), including those specifically mentioned herein, as well as others. Additionally, the System may be configured to output (or make available to users) the data it produces, and make that data easy for a user to leverage, in a variety of different ways. The System may be configured to take into account one or more (or all) of the weather-related data mentioned herein, as well as, perhaps, other weather-related data that may not have been explicitly mentioned herein. The System may be configured and adapted to create risk scores for all types of weather and other natural hazard perils, not just the perils mentioned herein.

In various implementations, the relational database can be one or more of virtually any kind of digital database whose organization is based on a relational model of data. Software systems used to maintain relational databases are generally known as relational database management systems (RDBMS). Most relational database systems use SQL (Structured Query Language) as the language for querying and maintaining the database.

The types of severity levels may differ depending on the type of peril and may be configurable by a human user (e.g., from one of the user terminals 114 in the system 100).

To ensure the risk scoring dynamically responds to new weather data and events, the system 100 may, in certain implementations, query the selected sources of information at predetermined time windows (which may be set by the user) to determine the existence of new data, if any, and to collect that data. In an exemplary embodiment, for SPC human observer data, the system 100 may perform real time HTTP retrieval requests every hour to obtain recent files that could potentially be updated on the NOAA server. The system's data gathering mechanism also may include a component to ensure only new data is collected. In an exemplary embodiment, the hourly SPC collection component may download the most recently available files on the NOAA server and compare them with previous file versions to determine if new human hail observations exist within the newly downloaded file. These comparisons may include, for example, first-order differences such as file size and row length discrepancies, in addition to more complex comparisons such as metadata comparisons. These metadata comparisons may include, for example, but are not limited to, observation time, observation location, size of hail by observation, or the narrative associated with the observation (commonly referred to as the "observational comment"). In other embodiments, and for other perils and data sources, the comparison techniques will differ.

In some implementations, the system 100 performs other processing techniques for other data sources and perils as necessary. For instance, in an exemplary embodiment, the system 100 queries (over the internet) servers hosted by NOAA's National Climate Data Center ("NCDC") which releases processed radar-derived observations across the United States daily. This component is analogous to the aforementioned human observation retrieval and processing workflow, including the download, comparison, parsing, and formatting of CSV information. However, since the underlying data is radar observed rather than human observed, the metadata analyzed and processed is different. This metadata typically includes descriptors for radar-estimated location (latitude-longitude geolocation), radar-estimated maximum expected hail size, and radar-estimated time. The analysis-processing techniques employed may include a transformation of the radar metadata as well as a spatial interpolation of the radar hail information to a geographic gridding system that is common to other data hail data sources utilized and stored in a relational database. This spatial interpolation scheme may utilize a nearest-neighbor analysis of every radar-estimated point of hail occurrence in comparison to the defined geographic gridding system. The process may assign radar-estimated hail metadata to those points on the gridding system who are nearest to radar-estimated points. In an exemplary embodiment, the defined gridding system may be described by a latitude-longitude geodesic spatial pattern with coverage in the continental United States at a 1 km spatial resolution, for example. After the gridding and metadata formatting is complete, a new CSV file may be created with the relevant hail information.

In various implementations, processed and/or formatted data mentioned herein, including historical and real time data, may be passed from a CSV format, or other format, into a storage medium or relational database for use with downstream processes. The process by which the processed and/or formatted data is passed to storage or the relational database can differ by data source. In an exemplary embodiment, the CSV resulting from NCDC radar data is passed into a relational database in similar fashion to the human observations, but utilizing a slightly different metadata formatting structure that conforms to the radar metadata descriptors. This full extract-transform-load process may be executed for each available historical hail radar file available from the NCDC data server repository.

In some embodiments, data from other data sources may be downloaded, extracted, and transformed at a variety of retrieval times that align with the dissemination of the respective data product. Further, given the variety of file formats disseminated (e.g., CSV, gridded binary [grib]), these components may employ different download and processing techniques. For instance, to calculate dynamic intense rainfall peril scores, the system 100 may query and download radar-derived quantitative precipitation estimates from a publicly available web server maintained by NOAA's National Weather Center's (NWS) National Centers for Environmental Prediction (NCEP). Other data sources supported by the system 100 may include ground station anemometer measurements and human anemometer observations of wind speeds (and gusts) from NOAA's SPC. Data from these data sources may be used by the system 100 to calculate dynamic straight-line wind risk scores, for example.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control (or controlling) the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Some of the operations described in this specification can be implemented as operations performed by a data processing apparatus (e.g., a processor) on data stored on one or more computer-readable storage devices or received from other sources. The term "processor" encompasses all kinds (and any number) of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions disclosed herein, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a described combination can in some cases be excised from the combination, and certain features disclosed may be combined into different subcombinations or variations thereof.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In various implementations, the functionalities disclosed herein and/or associated with the systems and technologies disclosed herein can be accessed from virtually any kind of electronic computing device(s), including, for example, desktop computers, laptops computers, smart phones, tablet, etc.

Any storage media referred to herein can be or include virtually any kind of media such as electronic, magnetic, optical, electromagnetic, infrared, or semiconductor system (or apparatus or device) or propagation media. Examples of suitable computer-readable media include semiconductor or solid-state memory, magnetic tape, removable computer diskettes, random access memory (RAM), read-only memory (ROM), rigid magnetic disks and/or optical disks.

In some implementations, certain functionalities described herein may be provided by a downloadable software application (i.e., an app). The app may, for example, implement or facilitate one or more (or all) of the functionalities described herein as taking place at or in association with a website.

Other implementations are within the scope of the claims.

What is claimed is:

1. A computer-based method of formulating and delivering dynamic, severity-based weather peril scoring, the method comprising:
   ingesting human-observed weather data and radar weather data;
   applying a grid that has a plurality of cells to a map of a geographical region to divide the geographical region into a plurality of areas, with each area being defined by a corresponding one of the grid cells;
   for each area/grid cell:
      calculating, with a computer-based processor, a first severity-weighted risk index for at least one weather peril based on the human-observed weather data;
      calculating, with the computer-based processor, a second severity-weighted risk index for the at least one weather peril based on the radar weather data; and
      blending, with the computer-based processor, the first severity-weighted risk index and the second severity-weighted risk index to produce a blended risk index,
   wherein calculating the first severity-weighted risk indices comprises:
      collecting the human-observed weather data;
      calculating raw probabilities of damage from the at least one weather peril based on the human-observed weather data;
      correcting the raw probabilities to account for population bias; and
      calculating the actual first severity-weighted risk indices based on the corrected probabilities.

2. The computer-based method of claim 1, wherein calculating the second severity-weighted risk indices comprises:
   collecting the radar weather data;
   calculating raw probabilities of damage from the at least one weather peril based on the radar weather data; and
   calculating the actual second severity-weighted risk indices based on the corrected probabilities.

3. The computer-based method of claim 1, wherein blending the first severity-weighted risk index and the second severity-weighted risk index to produce a blended risk index comprises:
   weighting the first severity-weighted risk index based on population density;
   weighting the second severity-weighted risk index based on radar quality;
   weighting the second severity-weighted risk index more than the first severity-weighted risk index.

4. The computer-based method of claim 1, further comprising applying spatial smoothing to the first severity-weighted risk indices, the second severity-weighted risk indices, and/or the blended risk indices across the areas/grid cells to produce at least smoothed-out blended risk indices.

5. The computer-based method of claim 4, wherein the spatial smoothing for a given area/grid cell comprises calculating a risk value for the given area/grid cell as a statistical average of the blended risk value for that given cell and risk values for all other areas/grid cells within a certain distance of that given cell.

6. The computer-based method of claim 4, further comprising:
   categorizing each area/grid cell into one of a plurality of possible risk zones.

7. The computer-based method of claim 6, wherein categorizing each area/grid cell into one of a plurality of possible risk zones comprises:
   calculating a first risk score by percentile-based binning the smoothed-out blended risk indices;
   calculating a second risk score by equal-interval binning the smoothed-out blended risk indices; and
   averaging the first risk score and the second risk score.

8. The computer-based method of claim 1, further comprising:
   enabling a human user to access weather peril scoring data from a user device, wherein the weather peril scoring data comprises: data superimposed on a map, with color-coded cells, categorized by peril scores.

9. A computer-based system configured to formulate and deliver dynamic, severity-based weather peril scoring, the system comprising:
   a computer-based processor, and
   a computer-based memory coupled to the computer-based processor, wherein the computer-based memory stores instructions which, when executed by the computer-based processor, cause the computer-based processor to:
      apply a grid that has a plurality of cells to a map of a geographical region to divide the geographical region into a plurality of areas, with each area being defined by a corresponding one of the grid cells; and
      for each area/grid cell:
         calculate a first severity-weighted risk index for at least one weather peril based on ingested human-observed weather data;
         calculate a second severity-weighted risk index for the at least one weather peril based on ingested radar weather data; and
         blend the first severity-weighted risk index and the second severity-weighted risk index to produce a blended risk index,
   wherein the instructions, when executed by the computer-based processor, further cause the computer-based processor to calculate the first severity-weighted risk indices by:
      collecting the human-observed weather data;
      calculating raw probabilities of damage from the at least one weather peril based on the human-observed weather data;
      correcting the raw probabilities to account for population bias; and
      calculating the actual first severity-weighted risk indices based on the corrected probabilities.

10. The computer-based system of claim 9, wherein the instructions, when executed by the computer-based processor, further cause the computer-based processor to calculate the second severity-weighted risk indices by:
  collecting the radar weather data;
  calculating raw probabilities of damage from the at least one weather peril based on the radar weather data; and
  calculating the actual second severity-weighted risk indices based on the corrected probabilities.

11. The computer-based system of claim 9, wherein the instructions, when executed by the computer-based processor, further cause the computer-based processor to produce the blended risk index by:
  weighting the first severity-weighted risk index based on population density,
  weighting the second severity-weighted risk index based on radar quality; and
  weighting the second severity-weighted risk index more than the first severity-weighted risk index.

12. The computer-based system of claim 11, wherein the instructions, when executed by the computer-based processor, further cause the computer-based processor to apply spatial smoothing to the first severity-weighted risk indices, the second severity-weighted risk indices, and/or the blended risk indices across the areas/grid cells to produce at least smoothed-out blended risk indices.

13. The computer-based system of claim 12, wherein the instructions, when executed by the computer-based processor, further cause the computer-based processor to apply the spatial smoothing for a given area/grid cell by calculating a risk value for the given area/grid cell as a statistical average of the blended risk value for that given cell and risk values for all other areas/grid cells within a certain distance of that given cell.

14. The computer-based system of claim 12, wherein the instructions, when executed by the computer-based processor, further cause the computer-based processor to:
  categorize each area/grid cell into one of a plurality of possible risk zones.

15. The computer-based system of claim 14, wherein the instructions, when executed by the computer-based processor, further cause the computer-based processor categorize each area/grid cell into one of a plurality of possible risk zones by:
  calculating a first risk score by percentile-based binning the smoothed-out blended risk indices;
  calculating a second risk score by equal-interval binning the smoothed-out blended risk indices; and
  averaging the first risk score and the second risk score.

16. The computer-based system of claim 9, further comprising:
  a computer-based user device configured to enable a human user to access weather peril scoring data, wherein the weather peril scoring data comprises: data superimposed on a map, with color-coded cells, categorized by peril scores.

17. A computer-based method of formulating and delivering dynamic, severity-based weather peril scoring, the method comprising:
  ingesting human-observed weather data and radar weather data;
  applying a grid that has a plurality of cells to a map of a geographical region to divide the geographical region into a plurality of areas, with each area being defined by a corresponding one of the grid cells;
  for each area/grid cell:
    calculating, with a computer-based processor, a first severity-weighted risk index for at least one weather peril based on the human-observed weather data;
    calculating, with the computer-based processor, a second severity-weighted risk index for the at least one weather peril based on the radar weather data; and
    blending, with the computer-based processor, the first severity-weighted risk index and the second severity-weighted risk index to produce a blended risk index,
  wherein calculating the second severity-weighted risk indices comprises:
    collecting the radar weather data;
    calculating raw probabilities of damage from the at least one weather peril based on the radar weather data; and
    calculating the actual second severity-weighted risk indices based on the corrected probabilities.

18. A computer-based method of formulating and delivering dynamic, severity-based weather peril scoring, the method comprising:
  ingesting human-observed weather data and radar weather data;
  applying a grid that has a plurality of cells to a map of a geographical region to divide the geographical region into a plurality of areas, with each area being defined by a corresponding one of the grid cells;
  for each area/grid cell:
    calculating, with a computer-based processor, a first severity-weighted risk index for at least one weather peril based on the human-observed weather data;
    calculating, with the computer-based processor, a second severity-weighted risk index for the at least one weather peril based on the radar weather data; and
    blending, with the computer-based processor, the first severity-weighted risk index and the second severity-weighted risk index to produce a blended risk index,
  wherein blending the first severity-weighted risk index and the second severity-weighted risk index to produce a blended risk index comprises:
    weighting the first severity-weighted risk index based on population density;
    weighting the second severity-weighted risk index based on radar quality;
    weighting the second severity-weighted risk index more than the first severity-weighted risk index.

19. A computer-based method of formulating and delivering dynamic, severity-based weather peril scoring, the method comprising:
  ingesting human-observed weather data and radar weather data;
  applying a grid that has a plurality of cells to a map of a geographical region to divide the geographical region into a plurality of areas, with each area being defined by a corresponding one of the grid cells;
  for each area/grid cell:
    calculating, with a computer-based processor, a first severity-weighted risk index for at least one weather peril based on the human-observed weather data;
    calculating, with the computer-based processor, a second severity-weighted risk index for the at least one weather peril based on the radar weather data; and
    blending, with the computer-based processor, the first severity-weighted risk index and the second severity-weighted risk index to produce a blended risk index, and applying spatial smoothing to the first severity-weighted risk indices, the second severity-weighted risk indices, and/or the blended risk indices across the areas/grid cells to produce at least smoothed-out blended risk indices.

20. The computer-based method of claim 19, wherein the spatial smoothing for a given area/grid cell comprises calculating a risk value for the given area/grid cell as a statistical average of the blended risk value for that given cell and risk values for all other areas/grid cells within a certain distance of that given cell.

21. The computer-based method of claim 19, further comprising:
categorizing each area/grid cell into one of a plurality of possible risk zones.

22. The computer-based method of claim 21, wherein categorizing each area/grid cell into one of a plurality of possible risk zones comprises:
calculating a first risk score by percentile-based binning the smoothed-out blended risk indices;
calculating a second risk score by equal-interval binning the smoothed-out blended risk indices; and
averaging the first risk score and the second risk score.

23. A computer-based system configured to formulate and deliver dynamic, severity-based weather peril scoring, the system comprising:
a computer-based processor, and
a computer-based memory coupled to the computer-based processor, wherein the computer-based memory stores instructions which, when executed by the computer-based processor, cause the computer-based processor to:
apply a grid that has a plurality of cells to a map of a geographical region to divide the geographical region into a plurality of areas, with each area being defined by a corresponding one of the grid cells; and
for each area/grid cell:
calculate a first severity-weighted risk index for at least one weather peril based on ingested human-observed weather data;
calculate a second severity-weighted risk index for the at least one weather peril based on ingested radar weather data; and
blend the first severity-weighted risk index and the second severity-weighted risk index to produce a blended risk index,
wherein the instructions, when executed by the computer-based processor, further cause the computer-based processor to calculate the second severity-weighted risk indices by:
collecting the radar weather data;
calculating raw probabilities of damage from the at least one weather peril based on the radar weather data; and
calculating the actual second severity-weighted risk indices based on the corrected probabilities.

24. A computer-based system configured to formulate and deliver dynamic, severity-based weather peril scoring, the system comprising:
a computer-based processor, and
a computer-based memory coupled to the computer-based processor, wherein the computer-based memory stores instructions which, when executed by the computer-based processor, cause the computer-based processor to:
apply a grid that has a plurality of cells to a map of a geographical region to divide the geographical region into a plurality of areas, with each area being defined by a corresponding one of the grid cells; and
for each area/grid cell:
calculate a first severity-weighted risk index for at least one weather peril based on ingested human-observed weather data;
calculate a second severity-weighted risk index for the at least one weather peril based on ingested radar weather data; and
blend the first severity-weighted risk index and the second severity-weighted risk index to produce a blended risk index,
wherein the instructions, when executed by the computer-based processor, further cause the computer-based processor to produce the blended risk index by:
weighting the first severity-weighted risk index based on population density;
weighting the second severity-weighted risk index based on radar quality; and
weighting the second severity-weighted risk index more than the first severity-weighted risk index.

25. The computer-based system of claim 24, wherein the instructions, when executed by the computer-based processor, further cause the computer-based processor to apply spatial smoothing to the first severity-weighted risk indices, the second severity-weighted risk indices, and/or the blended risk indices across the areas/grid cells to produce at least smoothed-out blended risk indices.

26. The computer-based system of claim 25, wherein the instructions, when executed by the computer-based processor, further cause the computer-based processor to apply the spatial smoothing for a given area/grid cell by calculating a risk value for the given area/grid cell as a statistical average of the blended risk value for that given cell and risk values for all other areas/grid cells within a certain distance of that given cell.

27. The computer-based system of claim 25, wherein the instructions, when executed by the computer-based processor, further cause the computer-based processor to:
categorize each area/grid cell into one of a plurality of possible risk zones.

28. The computer-based system of claim 27, wherein the instructions, when executed by the computer-based processor, further cause the computer-based processor categorize each area/grid cell into one of a plurality of possible risk zones by:
calculating a first risk score by percentile-based binning the smoothed-out blended risk indices;
calculating a second risk score by equal-interval binning the smoothed-out blended risk indices; and
averaging the first risk score and the second risk score.

* * * * *